US 8,705,377 B2

(12) United States Patent
Fraser

(10) Patent No.: US 8,705,377 B2
(45) Date of Patent: Apr. 22, 2014

(54) COMBINED SHORT-RANGE AND LONG-RANGE RADIO COMMUNICATION

(71) Applicant: Dominant Technologies, LLC, Mapleton, UT (US)

(72) Inventor: Ronald Harold Fraser, Mapleton, UT (US)

(73) Assignee: Dominant Technologies, LLC, Mapleton, UT (US)

(*) Notice: Subject to any disclaimer, the term of this patent is extended or adjusted under 35 U.S.C. 154(b) by 0 days.

(21) Appl. No.: 13/961,647

(22) Filed: Aug. 7, 2013

(65) Prior Publication Data

US 2013/0322424 A1 Dec. 5, 2013

Related U.S. Application Data

(63) Continuation of application No. 13/863,282, filed on Apr. 15, 2013.

(60) Provisional application No. 61/623,662, filed on Apr. 13, 2012, provisional application No. 61/681,399, filed on Aug. 9, 2012, provisional application No. 61/751,727, filed on Jan. 11, 2013.

(51) Int. Cl.
| | | |
|---|---|---|
| *G01R 31/08* | (2006.01) | |
| *G06F 11/00* | (2006.01) | |
| *G08C 15/00* | (2006.01) | |
| *H04L 5/26* | (2006.01) | |
| *H04W 72/04* | (2009.01) | |
| *H04W 4/10* | (2009.01) | |

(52) U.S. Cl.
CPC .............. *H04L 5/26* (2013.01); *H04W 72/0446* (2013.01); *H04W 4/10* (2013.01)

USPC .......................................................... 370/243

(58) Field of Classification Search
CPC ........................................................ H04L 5/26
USPC .......................................................... 370/243
See application file for complete search history.

(56) References Cited

U.S. PATENT DOCUMENTS 6,542,494 B1  4/2003  Sugaya et al.
6,590,928 B1  7/2003  Haartsen (Continued)

OTHER PUBLICATIONS

U.S. Appl. No. 10/194,115, dated Dec. 13, 2005, Office Action, 8 pages.

(Continued)

*Primary Examiner* — Mark Rinehart
*Assistant Examiner* — Maharishi Khirodhar
(74) *Attorney, Agent, or Firm* — Kilpatrick Townsend & Stockton LLP

(57) ABSTRACT

A multivoice radio system allows users to speak and listen, at the same time, to others using multivoice radios without using a base station. Several embodiments of the present invention are directed toward combining a multivoice radio with push-to-talk (PTT), long-range radio. Other embodiments combine two or more multivoice systems and/or use an extender to increase a distance that multivoice radios can communicate with each other. Combining multivoice systems, in some embodiments, creates a voice and/or data mesh network. Switch-to-talk (STT) functionality can be added to systems to increase a number of users and promote radio discipline. Additionally, a combined in-ear microphone and speaker is disclosed. Further embodiments are directed to combining duplex radios, such as mobile phones, to multivoice systems, and/or PTT systems.

20 Claims, 27 Drawing Sheets

(56) References Cited

U.S. PATENT DOCUMENTS

| | | |
|---|---|---|
| 8,150,450 B1 * | 4/2012 | Wengrovitz ............... 455/550.1 |
| 2002/0067709 A1 | 6/2002 | Yamada et al. |
| 2003/0035406 A1 | 2/2003 | Fraser |
| 2005/0111383 A1 | 5/2005 | Grob et al. |
| 2008/0057857 A1 | 3/2008 | Smith |
| 2012/0058754 A1 * | 3/2012 | Couse et al. .................. 455/416 |

OTHER PUBLICATIONS

U.S. Appl. No. 13/961,736, Office Action dated Oct. 17, 2013, 5 pages.

* cited by examiner

COMBINED SHORT-RANGE AND LONG-RANGE RADIO COMMUNICATION

This application is a continuation of U.S. application Ser. No. 13/863,282, filed Apr. 15, 2013, which claims the benefit of and is a non-provisional of U.S. Application Nos. 61/623,662 filed on Apr. 13, 2012, No. 61/681,399 filed on Aug. 9, 2012, and No. 61/751,727 filed on Jan. 11, 2013, each of which is hereby expressly incorporated by reference in its entirety for all purposes.

BACKGROUND

This disclosure relates in general to radio communication, and more specifically, without limitation, to two-way portable radio communication and time-division multiplexed communication. Two-way radios, generally referred in this application as simply radios, enable wireless communication between two or more people. To operate, many radios require either a push-to-talk (PTT) button or a voice operated switch (VOX). For example, walkie-talkies today require either a PTT button or VOX. One disadvantage of both PTT and VOX is that both PTT and VOX communications are half-duplex. In half-duplex communication, a radio can either transmit or receive at a given time, not both. In this application, the term PTT radio generally refers to radios using half-duplex communication where a user can either speak or listen at a given time, not both.

Full-duplex communication, commonly referred to as duplex communication, permits a radio to simultaneously transmit and receive at the same time, enabling a user of a duplex radio to both speak and listen at the same time. One way a radio can operate in a duplex mode, without needing a PTT button or VOX, is by using a base station. An example of wireless radios connected by a base station, and thus enabling full-duplex communication, is two users talking to each other using cell phones. Another example of wireless radios connected by a base station is a home telephone system with wireless telephones that can be placed in a conferencing mode.

SUMMARY

Radios can operate in duplex communication without a base-station using time division multiplexing such as a time-division multiple access (TDMA) protocol. An example of radios communicating using a TDMA protocol system to create a wireless-conferencing system that does not use a base station is disclosed in U.S. patent application Ser. No. 10/194,115, filed on Jul. 11, 2002. A conferencing system similar to that disclosed in application '115 is also referred to in this application as a multivoice system. A radio that operates using a wireless-conferencing system similar to the '115 application is referred to in this application as a multivoice radio. A multivoice system allows users to speak and listen, at the same time, to others using multivoice radios. Several embodiments of the present invention are directed toward combining a multivoice radio with a PTT radio. Other embodiments combine two or more multivoice systems and/or use an extender to increase a distance that multivoice radios can communicate with each other. Combining multivoice systems, in some embodiments, creates a voice and/or data mesh network. Further embodiments are directed to combining duplex radios, such as mobile phones, to multivoice systems, and/or PTT systems. Different embodiments of radio transmission can include direct sequence spread spectrum communication, frequency hopping spread spectrum communication, and/or single channel communication.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Several embodiments of the present invention are directed toward combining a multivoice radio with a PTT radio. Other embodiments combine two or more multivoice systems and/or use an extender to increase a distance that multivoice radios can communicate with each other. Combining multivoice systems, in some embodiments, creates a voice and/or data mesh network. Further embodiments are directed to combining duplex radios, such as mobile phones, with multivoice systems, and/or PTT systems. Other embodiments are directed to a switch-to-talk feature for a radio. Still other embodiments are for a combined in-ear microphone and speaker. Different embodiments of radio transmission can include direct sequence spread spectrum communication, frequency hopping spread spectrum communication, and/or single channel communication.

Figure 1:
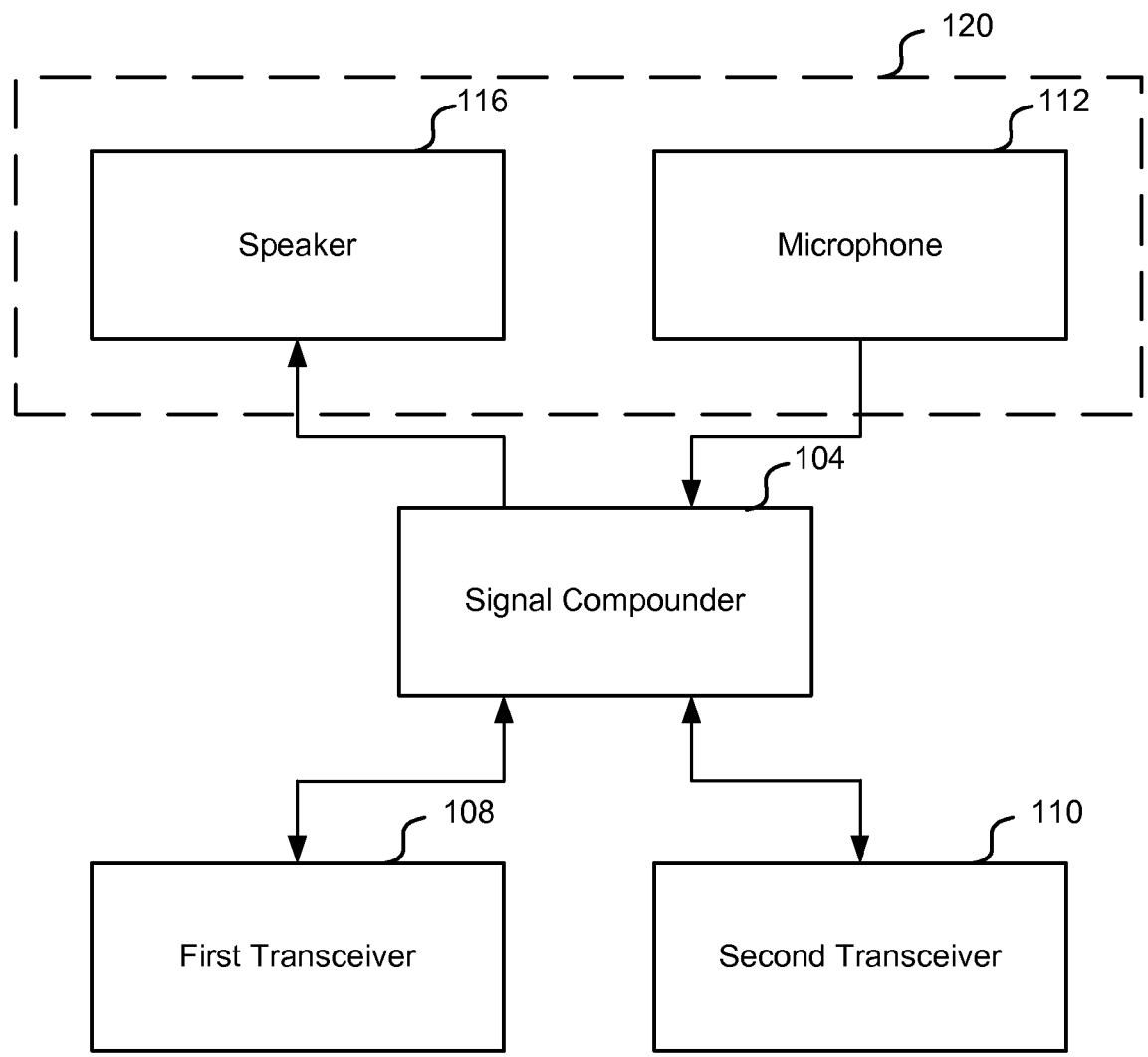
FIG. 1 depicts a block diagram of an embodiment of a signal compounder connected to a first transceiver, a second transceiver, and a headset having a microphone and a speaker.

With reference to FIG. 1, a block diagram is shown of an embodiment of a signal compounder 104 connected to a first transceiver 108, a second transceiver 110, and a headset 120 having a microphone 112 and a speaker 116. The first transceiver 108 operates in a first frequency band. A frequency band is a range of one or more frequencies in an electromagnetic spectrum. The first transceiver communicates with a first set of radios operating in the first frequency band. The first set of radios includes one or more radios. In different embodiments the first set of radios includes PTT radios, multivoice radios, and/or duplex radios. In different embodiments the first set of radios may also contain or be connected to a Global Positioning Satellite (GPS) receiver.

The second transceiver 110 operates in a second frequency band. In some embodiments, there is total overlap of frequencies in the first frequency band and the second frequency band. For example, the first frequency band could be the same as the second frequency band or the second frequency band could be a subset of frequencies of the first frequency band. In other embodiments there is partial overlap of frequencies in the first frequency band and the second frequency band. In still further embodiments, there is no overlap of frequencies in the first frequency band and the second frequency band. The second transceiver 110 communicates with a second set of radios. The second set of radios includes one or more radios. The second set of radios can comprise PTT radios, multivoice radios, and/or duplex radios.

In the embodiment shown, the microphone 112 and speaker 116 are parts of a headset 120. For example, the speaker 116 could be mono or stereo headphones that cover ears of a user with the microphone 112 attached to a boom. In other embodiments, the speaker 116 and microphone 112 are combined in a single in-ear piece. In still further embodiments, the speaker 116 and microphone 112 are built into a same housing as a transceiver. Various combinations or permutations of where the speaker 116 and microphone 112 are located can also be selected, such as using a speaker 116 in a headset 120 but using a built-in microphone 112.

The signal compounder 104 can combine various signals by multiplexing and/or separate various signals by demultiplexing. The signal compounder 104 receives a first signal from the first transceiver 108 and a second signal from the second transceiver 110. The signal compounder 104 can receive the first signal from the first transceiver 108 and the second signal from the second transceiver 110 by a wire (e.g., physical connector) and/or wirelessly (e.g., Bluetooth). The signal compounder 104 combines the first signal with the second signal to make a first combined signal. The signal compounder 104 transmits the combined signal to the speaker 116 either by a wire or wirelessly. The speaker 116 transduces the first combined signal to audio for the user.

The signal compounder 104 also receives a third signal from a microphone 112. The signal compounder 104 can receive the third signal through a wire or wirelessly. The microphone 112 transduces audio, such as speech of the user, into the third signal. The signal compounder 104 combines the third signal from the microphone 112 with the second signal from the second transceiver 110 to create a second combined signal. The signal compounder 104 transmits the second combined signal to the first transceiver 108 for transmission to the first set of radios. The signal compounder 104 combines the third signal from the microphone 112 with the first signal from the first transceiver 108 to create a third combined signal. The signal compounder 104 transmits the third combined signal to the second transceiver 110 for transmission to the second set of radios. The signal compounder 104 can also include various combining algorithms, filters, echo cancelation, etc. The signal compounder 104, in certain embodiments, allows the user to switch between various modes and privacy settings, such as allowing the first transceiver 108 to receive communication from the second transceiver 110, but not letting the second transceiver receive communications from the first transceiver 108.

Figure 2A:
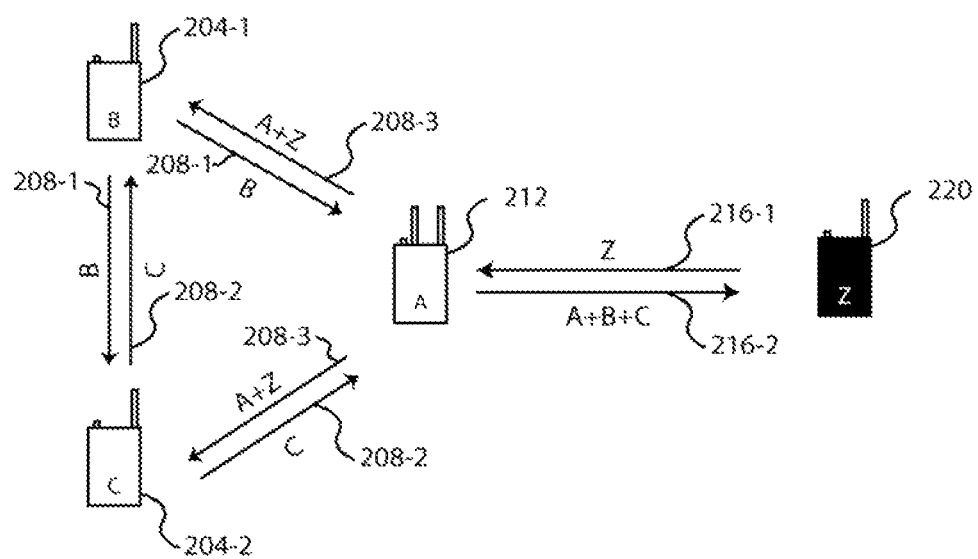
FIG. 2A depicts a block diagram of an embodiment of a combined short-range and long-range radio system using a signal compounder housed in a short-range and long-range (SLR) radio.

Referring next to FIG. 2A, a block diagram of an embodiment of a combined short-range and long-range radio system using a signal compounder 104 housed in a short-range and long-range (SLR) radio 212 is shown. The SLR radio 212 is a dual-transceiver radio housing the first transceiver 108 and the second transceiver 110. The SLR radio also includes a microphone 112 and a speaker 116, either connected as a headset 120 or integrated into the housing of the SLR radio 212. In this and other embodiments, each radio has a microphone 112 and a speaker 116, either built in and/or connected (either wired or wirelessly). The SLR radio 212 is shown communicating with a plurality of other radios. The SLR radio 212 communicates, via the first transceiver 108, with both a first multivoice radio 204-1 and a second multivoice radio 204-2. The first multivoice radio 204-1 and the second multivoice radio 204-2 are short-range radios operating in the first frequency band. The SLR radio 212 also communicates, via the second transceiver 110, with a long-range radio 220. The long-range radio 220 is a PTT radio and operates in the second frequency band. In this embodiment, there is no overlap of frequencies in the first frequency band and the second frequency band.

The first multivoice radio 204-1 transmits a first short-range signal 208-1 to both the second multivoice radio 204-2 and the SLR radio 212. The SLR radio 212 and the second the second multivoice radio 204-2 receive the first short-range signal 208-1. The second multivoice radio 204-2 transmits a second short-range signal 208-2 to both the first short-range radio 204-1 and the SLR radio 212. The short range signals 208 are transmitted in the first frequency band. The long-range radio 220 transmits a first long-range signal 216-1 to the SLR radio 212.

The signal compounder 104, in the SLR radio 212, combines the first short-range signal 208-1, the second short-range signal 208-2, and the first long-range signal 216-1 to create a first combined signal. The SLR radio 212 then transmits the first combined signal to the speaker 116 of the SLR radio 212. Thus a user of the SLR radio 212 can hear communication from the first multivoice radio 204-1, the second multivoice radio 204-2, and the long-range radio 220.

The signal compounder 104 combines the signal from the microphone 112 of the SLR radio 212 with the second long-range signal 216-1 to create a second combined signal. Signals can be combined using techniques known in the art. For example, signals can be multiplexed and/or summed. The SLR radio 212 transmits a third short-range signal 208-3 to both the first multivoice radio 204-1 and the second multivoice radio 204-2, where the third short-range signal 208-3 carries the second combined signal. Thus users of the first multivoice radio 204-1 and the second multivoice radio 204-2 can hear communication from the SLR radio 212 and the long-range radio 220.

The signal compounder 104 combines the signal from the microphone 112 with the first short-range signal 208-1 and the second short-range signal 208-2 to create a third combined signal. The SLR radio 212 transmits a second long-range signal 216-2 to the long-range radio 220, the second long-range signal 216-2 carrying the third combined signal. Thus a user of the long-range radio 220 can hear communication from the SLR radio 212, the first short-range radio 204-1, and the second short-range radio 204-2.

To aid in understanding embodiments of the invention, in this and other figures, a letter is assigned to a radio and/or headset and written next to a signal to show a composition of that signal. As shown in the figure, the SLR radio 212 is labeled with an A, the first multivoice radio 204-1 is labeled with a B, and the second multivoice radio 204-2 is labeled with a C. Under the second long-range signal 216-2 is written "A+B+C" to signify that the second long-range signal 216-2 carries communication from the SLR radio 212, the first multivoice radio 204-1, and the second multivoice radio 204-2.

Figure 2B:
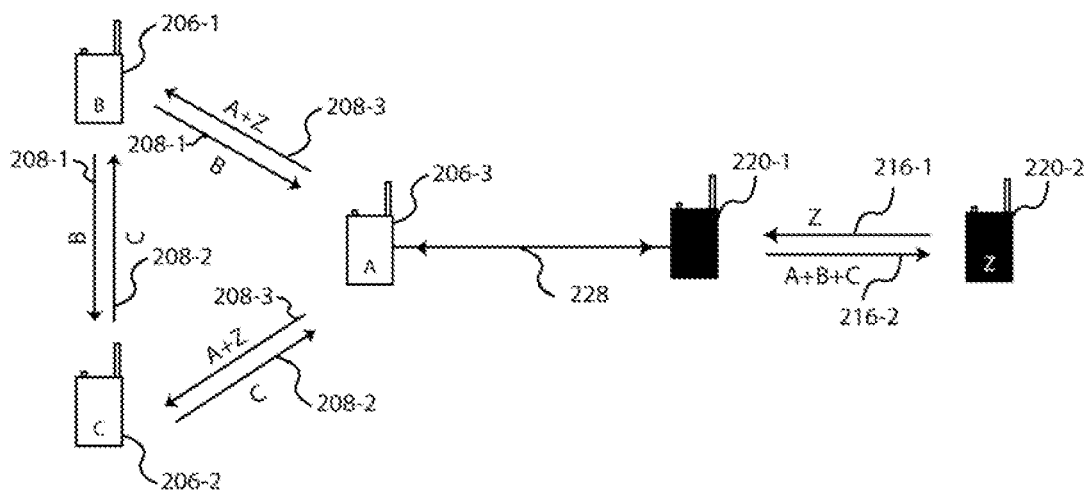
FIGS. 2B and 2C depict block diagrams of an embodiment of a combined short-range and long-range radio system using a signal compounder housed in a multivoice radio and connected to a long-range radio.
Figure 2C:
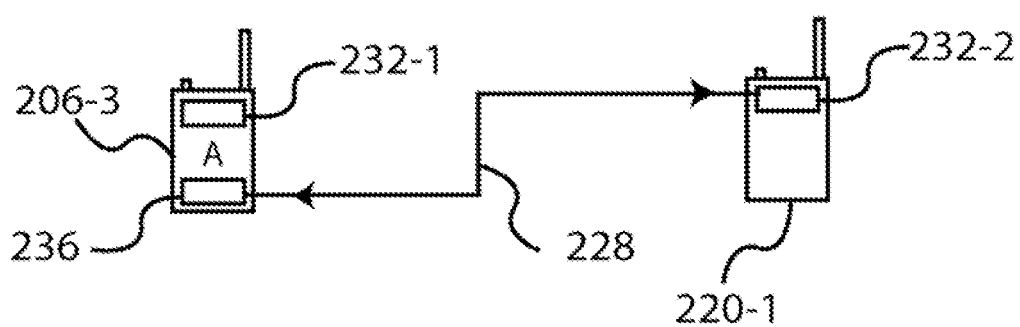

Referring next to FIGS. 2B and 2C, block diagrams of an embodiment of a combined short-range and long-range radio system using a modified multivoice (MMV) radio 206 connected to a first long-range radio 220-1 are shown. In FIG. 2B, a multivoice radio 204 is modified by adding a signal compounder 104 in the same housing as the multivoice radio 204, creating an MMV radio 206. FIG. 2B is similar to FIG. 2A, except the first multivoice radio 204-1 is replaced with a first MMV radio 206-1; the second multivoice radio 204-2 is replaced with a second MMV radio 206-2; and the SLR radio 212 is replaced with a combination of a third MMV radio 206-3 and the first long-range radio 220-1. Thus instead of a single radio, the SLR radio 212, housing the signal compounder 104, the first transceiver 108, and the second transceiver 110; the third MMV radio 206-3 houses the first transceiver 108, and the signal compounder 104 and the first long-range radio acts as the second transceiver 110. The third MMV radio 206-3 is connected to the first long-range radio 220-1 by a wired connection 228 comprising one or more wires. The wired connection 228 may contain voice and/or data. The first long-range radio 220-1 transmits and receives radio signals from a second long-range radio 220-2. Although the third MMV radio 206-3 is shown connected to the first long-range radio 220-1 by a wired connection 228 a wireless connection may also be used.

The signal compounder 104 in the third MMV radio 206-3 combines different signals in a manner similar to the signal compounder 104 in the SLR radio 212 in FIG. 2A. For example, a user of the first MMV radio 206-1 can hear users of the third MMV radio 206-3 and the second long-range radio 220-2. The user of the second long-range radio 220-2 can hear users of the first MMV radio 206-1 and the second MMV radio 206-2 through the third MMV radio 206-3 and the first long-range radio 220-1. In this figure, the first MMV radio 206-1 and the second MMV 206-2 are shown. The first MMV radio 206-1 could be replaced with the first multivoice radio 204-1 and/or the second MMV radio 206-2 could be replaced with the second multivoice radio 204-1 and still have similar functionality.

FIG. 2C shows more details in the connection between the third MMV radio 206-3 and the first long-range radio 220-1 of FIG. 2B according to some embodiments of the invention. The third MMV radio 206-3 has both a headset port 232-1 and an auxiliary port 236. The first long-range radio 220-1 has a headset port 232-2. A headset port 232 allows a connection to an external microphone 112 and/or speaker 116, such as by allowing a headset 120 to be plugged into the headset port 232. Different radios have different types of headset ports 232. For example, a headset port 232 could receive a cylindrical audio connector, such as a standard 6.35 mm, 3.5 mm, or 2.5 mm diameter TS, TRS, and/or TRRS connector. Or the headset port 232 could have a proprietary or standard multi-pin receptacle.

The wired connection 228 connects the auxiliary port 236 of the third MMV radio 206-3 to the headset port 232-2 of the first long-range radio 220-1. In some embodiments, plugging a connector into a headset port 232 can disable a built-in microphone and/or speaker. Connecting the wired connection 228 to the auxiliary port 236 of the third MMV radio 206-3 allows a user to still use the microphone 112 and the speaker 116 of the third MMV radio 206-3.

Figure 2D:
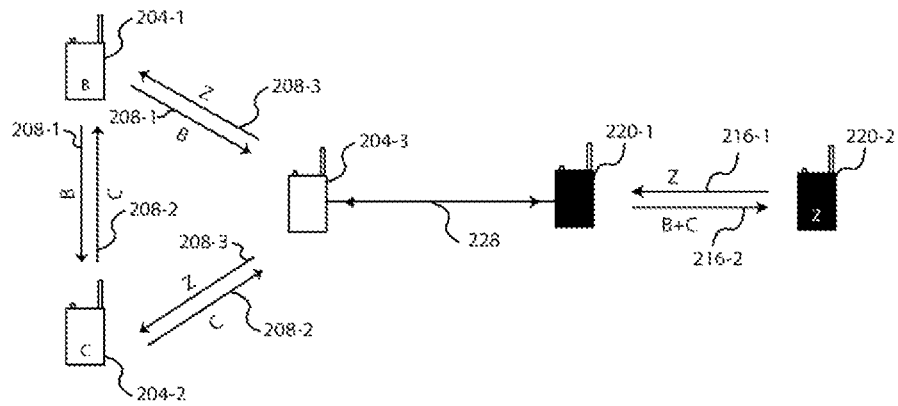
FIGS. 2D and 2E depict block diagrams of an embodiment of a multivoice system combined with a long-range radio without using a signal compounder.
Figure 2E:
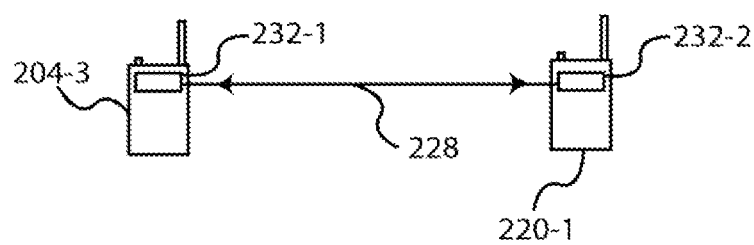

Referring next to FIGS. 2D and 2E, block diagrams of an embodiment of a multivoice system combined with a long-range radio without using a signal compounder 104 are shown. FIG. 2D is similar to FIG. 2B except the first MMV radio 206-1, is replaced with the first multivoice radio 204-1, the second MMV radio 206-2 is replaced with the second multivoice radio 204-2 and the third MMV radio is replaced with a third multivoice radio 204-3. The third multivoice radio 204-3 is connected by the wired connection 228 to the first long-range radio 220-1.

FIG. 2E shows a more detailed connection between the third multivoice radio 204-3 and the first long-range radio 220-1 of FIG. 2D according to some embodiments of the invention. FIG. 2E shows the third multivoice radio 204-3 with a headset port 232-1. The second long-range radio 220-1 with a headset port 232-2 is also shown. The wired connection 228 connects the headset port 232-1 of the third multivoice radio 204-1 to the headset port 232-2 of the first long-range radio 220-1. In this configuration, a speaker output of the second long-range radio 220-1 becomes a microphone input to the third multivoice radio 204-3. And a speaker output of the third multivoice radio 204-3 becomes a microphone input to the first long-range radio 220-1. The third multivoice radio 204-3 treats signals received from the first long-range radio 220-1 as an input signal and multiplexes the signals received from the long-range radio 220-1 for transmission to the first multivoice radio 204-1 and the second multivoice radio 204-2.

Figure 2F:
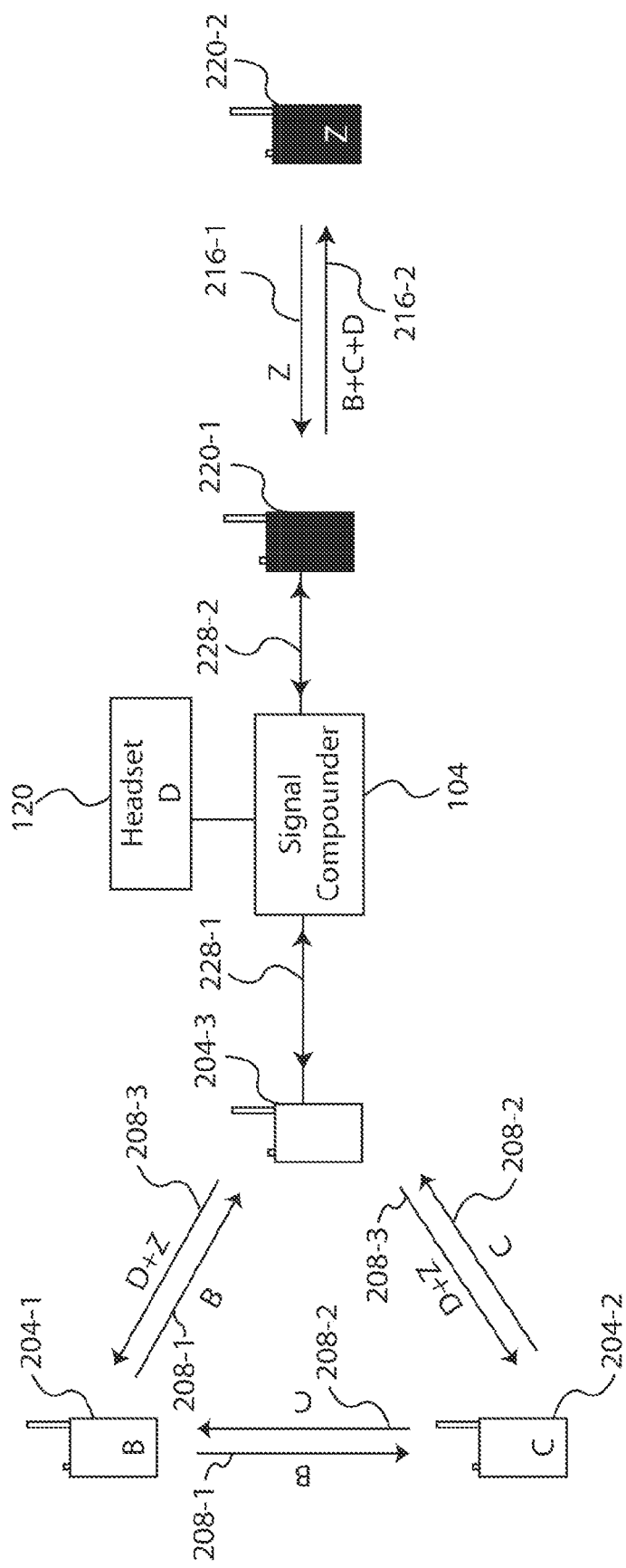
FIG. 2F depicts a block diagram of an embodiment of a combined short-range and long-range radio system with a signal compounder connected to a multivoice radio as the first transceiver and the signal compounder connected to a long-range radio as the second transceiver.

Referring next to FIG. 2F, a block diagram of an embodiment of a combined short-range and long-range radio system with the signal compounder 104 not embedded in a radio is shown. FIG. 2F is similar to FIG. 2A, except the SLR radio 212 is replaced with a combination of the signal compounder 104, the third multivoice radio 204-3, the first long-range radio 220-1, and a headset 120. The signal compounder 104 is in its own housing (i.e., not embedded in another radio). The signal compounder 104 is connected to the third multivoice radio 204-3 through a first wired connection 228-1. The signal compounder 104 is connected to the first long-range radio 220-1 through a second wired connection 228-2. The signal compounder 104 is connected to the headset 120. The third multivoice radio 204-3 acts as the first transceiver 108 and the first long-range radio 220-1 acts as the second transceiver. The first long-range radio 220-1 transmits and receives signals from a second long-range radio 220-2. The third multivoice radio 204-3 transmits and receives signals from the first multivoice radio 204-1 and the second multivoice radio 204-2. More multivoice radios 204 and/or long range radios 220 could be added. For example, there could be eight multivoice radios 204 communicating with each other and the third multivoice radio 204-3.

In one embodiment, the wired connection 228-1 between the signal compounder 104 and the third multivoice radio 204-3 includes six wires. Two wires are used to differentially drive a speaker. Two wires are used to differentially drive a microphone. One wire is used to transmit power from the third multivoice radio 204-3 to the signal compounder 104. And one wire is used as ground. Various other embodiments can include different numbers of wires and other wire configurations. For example, a four wire connector could include one speaker wire, one microphone wire, ground, and a wire for power. Or a connector could have two, three, or four wires, such as for connecting to a mobile telephone for connecting to audio port.

The signal compounder 104 in FIG. 2F functions similarly to the signal compounder 104 housed in the SLR radio 212 in FIG. 2A. The signal compounder 104 combines signals from the headset 120, the third multivoice radio 204-3 and the first long-range radio 220-1. For example, the first multivoice radio 204-1 receives communications from the headset 120 and the second long-range radio 220-2. The second long-range radio 220-2 receives communications from the headset 120 and the first multivoice radio 204-1. By using the signal compounder 104 in a separate housing, inputs and outputs can be summed and/or excluded similarly to the embodiments shown for the SLR radio 212.

Figure 3A:
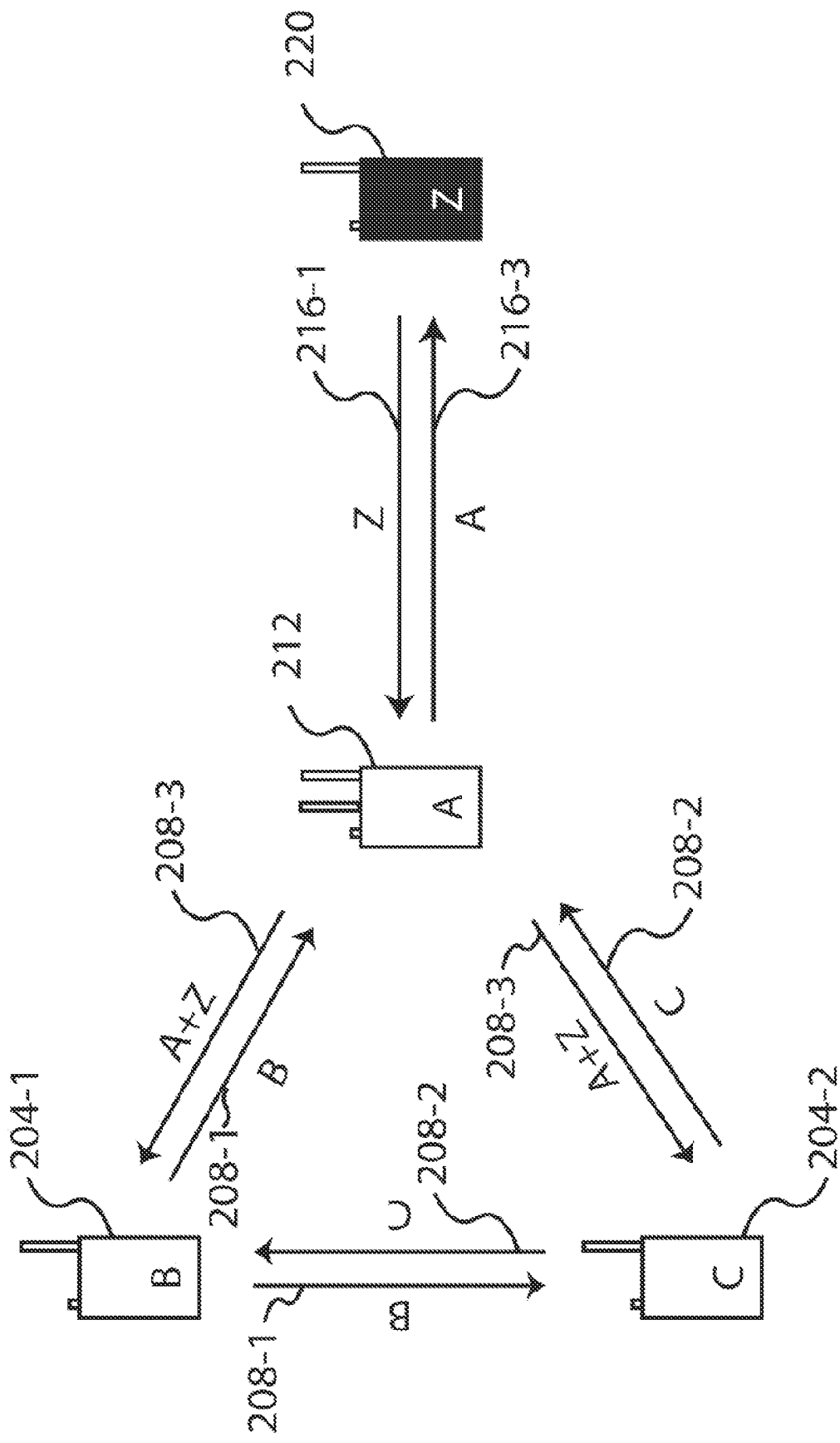
FIGS. 3A, 3B, and 3C depict block diagrams of embodiments of different communication modes of a combined short-range and long-range radio system.
Figure 3B:
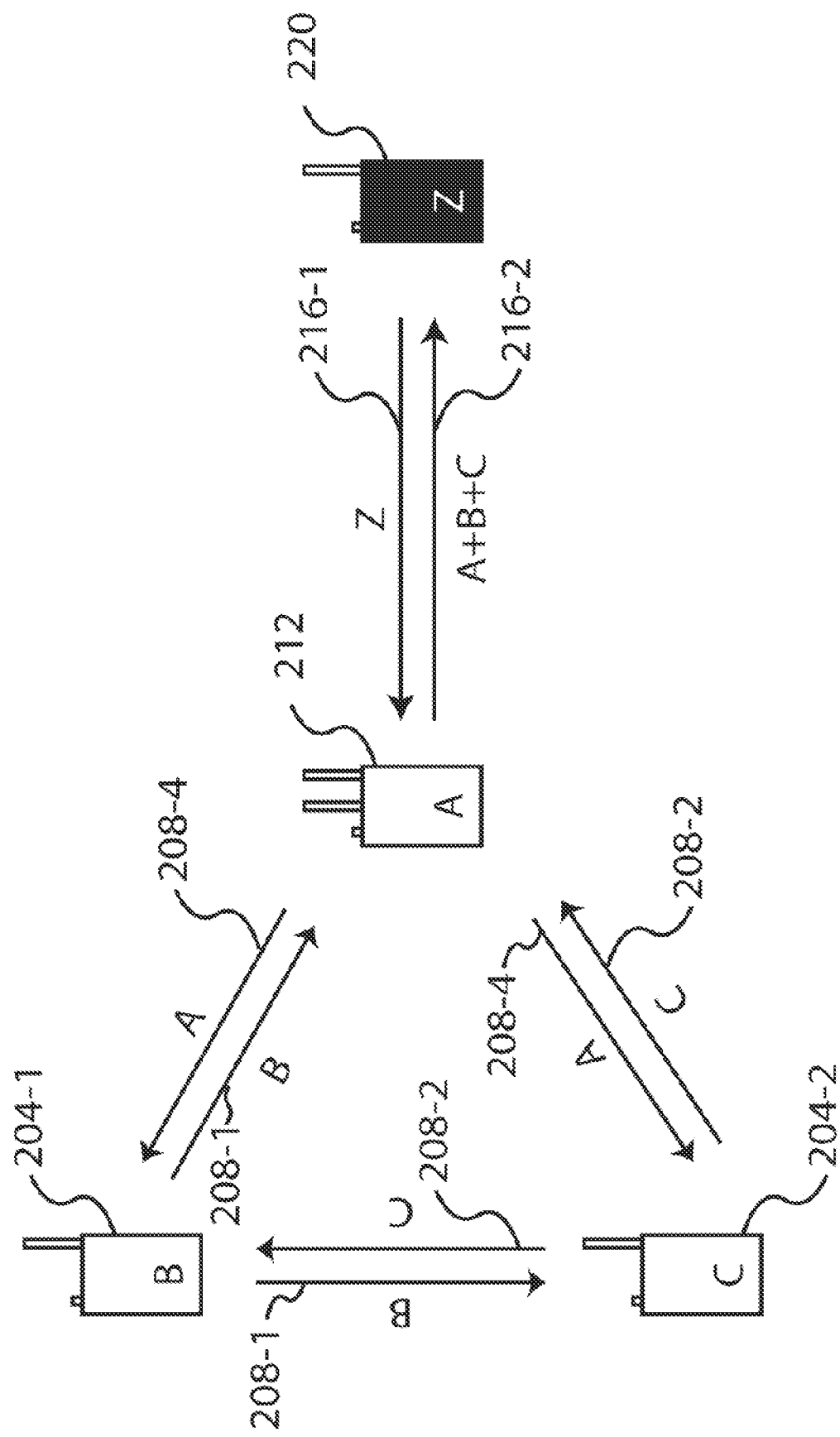
Figure 3C:
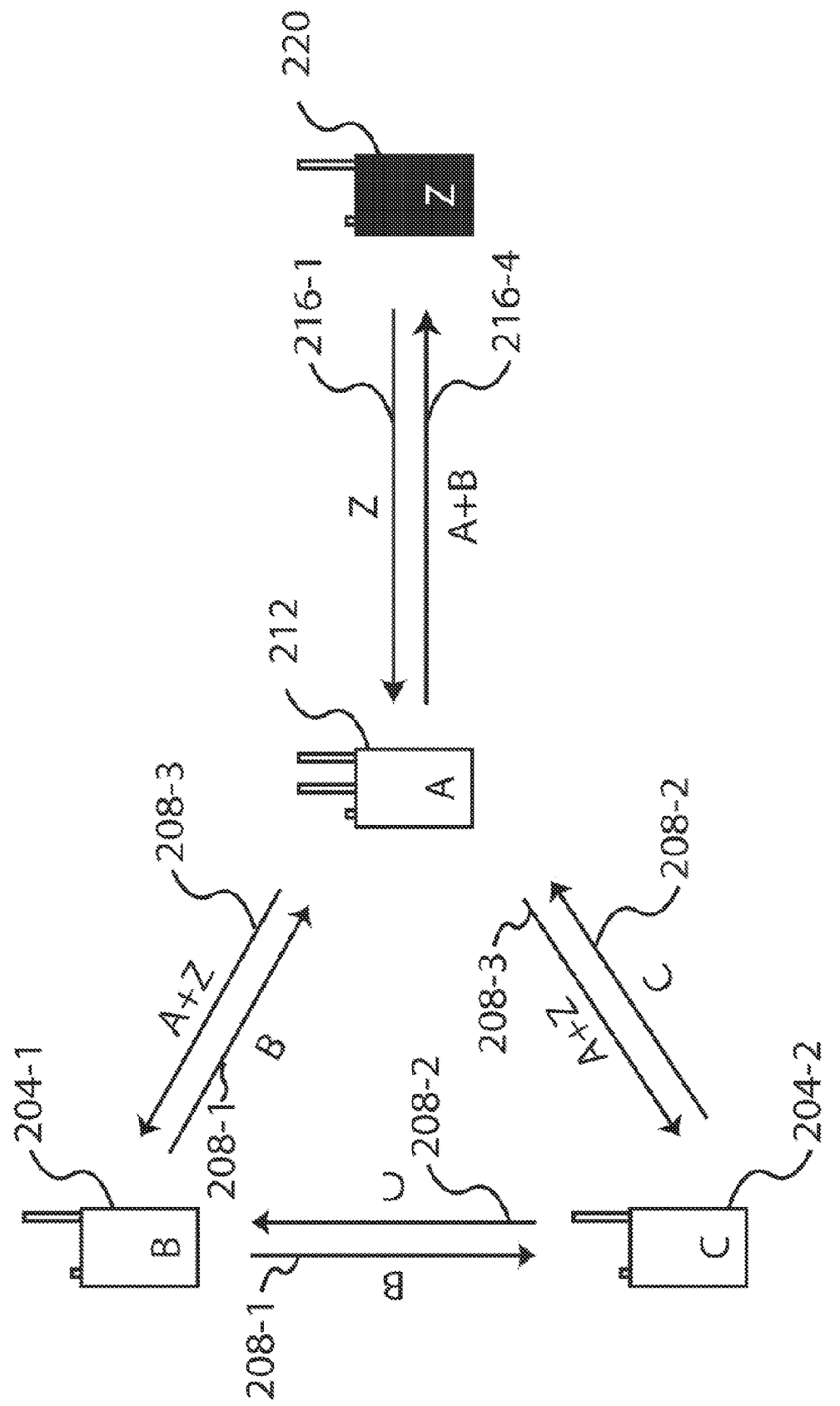

In FIGS. 3A, 3B, and 3C, embodiments of different modes, or privacy configurations, are shown. FIGS. 3A, 3B, and 3C are similar to the SLR system previously described in FIG. 2A, but with changes as described below. In FIG. 3A, the SLR radio 212 transmits the third short-range signal 208-3, which contains communications from the SLR radio 212 (i.e., from a user through the microphone 112) and communications from the long-range radio 220. But instead of transmitting the second long-range signal 216-2, the SLR radio 212 transmits a third long-range signal 216-3 that includes communication from SLR radio 212, but not communications from the multivoice radios 204. Thus users of the first multivoice radio 204-1 and the second multivoice radio 204-2 can hear communication from the SLR radio 212 and the long-range radio 220. But a user of the long-range radio 220 cannot hear communication from the first multivoice radio 204-1 or the second multivoice radio 204-2. A user of the SLR radio 212 can hear communication from the first multivoice radio 204-1, the second multivoice radio 204-2, and the long-range radio 220.

In FIG. 3B, the SLR radio 212 transmits the second long-range signal 216-2, which contains communications from the SLR radio 212, the first multivoice radio 204-1, and the second multivoice radio 204-2. But the SLR radio 212 does not transmit the third short-range signal 208-3. Instead, the SLR radio 212 transmits a fourth short-range signal 208-4 to the first multivoice radio 204-1 and the second multivoice radio 204-2 that include communication from the SLR radio 212, but not communications from the long-range radio 220. Thus the user of the long-range radio 220 can hear communication from the SLR radio 212, the first multivoice radio 204-1, and the second multi-voice radio 204-2. But the first multivoice radio 204-1 and the second multivoice radio 204-2 do not hear communication from the long-range radio 220.

In FIG. 3C, the SLR radio 212 still transmits the third short-range signal 208-3, which contains communications from the SLR radio 212 and the long-range radio 220. But instead of the second long-range signal 216-2, the SLR radio 212 transmits a fourth long-range signal 216-4 that contains communications from the SLR radio 212 and the first multivoice radio 204-1, but not communication from the second multivoice radio 204-2 (even though the second multivoice radio 204-2 is transmitting). Thus users of the first multivoice radio 204-1 and the second multivoice radio 204-2 can hear communication from the long-range radio 220. A user of the long-range radio 220 can hear communication from the first multivoice radio 204-1, but cannot hear communication from the second multivoice radio 204-2.

Other permutations of combined signals can be used, but are not shown. For example, a user of the SLR radio 212 could mute the microphone 112 so that neither the multivoice radios 204 nor the long-range radio 220 receive communication from the SLR radio 212; but the multivoice radios 204 and the long-range radio 220 could still receive communication from each other. Additionally, in one embodiment a user of the SLR radio 212 changes between modes using switches, toggles, touchscreen inputs, voice commands, and/or buttons on the SLR radio 212.

Though embodiments in certain figures have been illustrated using an SLR radio 212, similar modes for combining and/or excluding signals can also be performed using the signal compounders 104 in systems as described in FIGS. 2B and 2F. For example, the signal compounder 104 in FIG. 2F that is attached to the third multivoice radio 204-3, the first long-range radio 220-1, and the headset 120, can replace the SLR radio 212 in FIGS. 3A, 3B, and 3C.

Figure 4:
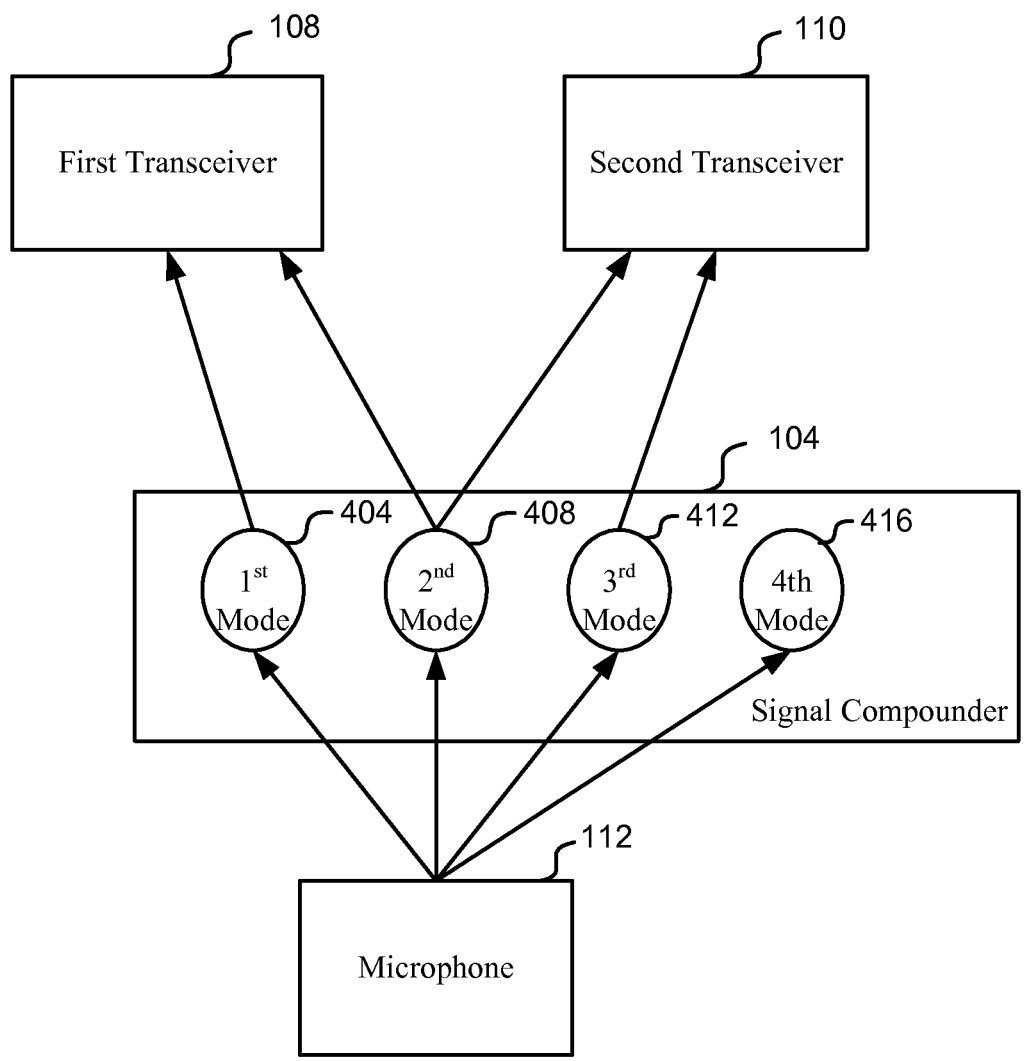
FIG. 4 depicts a block diagram of an embodiment of the signal compounder showing different modes for privacy selection of the microphone.

FIG. 4 shows a block diagram of an embodiment of a portion of the signal compounder 104. In this embodiment, the signal compounder 104 is connected to the first transceiver 108, the second transceiver 110, and the microphone 112. The signal compounder 104 has four modes for transmitting signals from the microphone 112. In a first mode 404 for transmitting signals from the microphone 112, a signal from the microphone is transmitted to the first transceiver 108, but not the second transceiver 110. In a second mode 408 for transmitting signals from the microphone 112, the signal from the microphone 112 is transmitted to both the first transceiver 108 and the second transceiver 110. In a third mode 412 for transmitting signals from the microphone 112, the signal from the microphone 112 is transmitted to the second transceiver 110, but not to the first transceiver 108. In the fourth mode 416 for transmitting signals from the microphone 112, the signal from the microphone is not transmitted to either the first transceiver 108 or the second transceiver 110 (i.e., muted).

The first mode 404, the second mode 408, the third mode 412, and the fourth mode 416 can be selected or toggled between using one or more switches, toggles, and/or buttons. For example, in one embodiment the fourth mode 416 is the default mode and the microphone 112 is muted unless a user presses a transmit button. In combination with the transmit button, a selection switch selects either the first mode 404, the second mode 408, or the third mode 412. When the selection switch indicates the second mode 408, and the transmit button is pressed, the signal compounder 104 transmits signals from the microphone 112 to both the first transceiver 108 and the second transceiver 110. When the selection switch indicates the first mode 404, and the transmit button is depressed, the signal compounder 104 transmits signals from the microphone 112 to the first transceiver 108, but not the second transceiver 110. If the transmit button is not depressed, the signal compounder operates in the fourth mode 416 and the microphone 112 is muted. The signal compounder 104 does not need to have all four modes. For example, the signal compounder 104 could have just the first mode 404, the second mode 408, and the third mode 412. The signal compounder 104 could just have the first mode 404 and the second mode 408. Or the signal compounder 104 could have just the second mode 408 and the fourth mode 416. In this way, a user with the headset 120 can communicate using both the first transceiver 108 and the second transceiver 110 and have the flexibility to switch between modes.

Figure 5A:
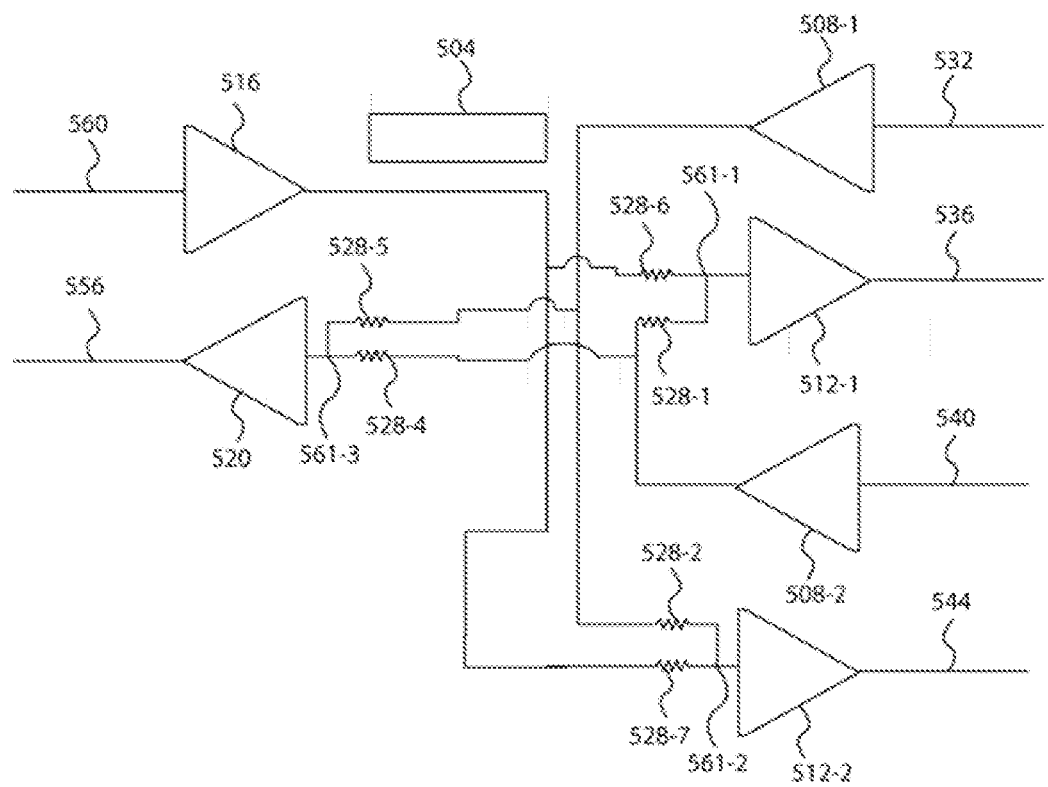
FIGS. 5A and 5B depict schematic diagrams of embodiments of the signal compounder for combining two radio systems.
Figure 5B:
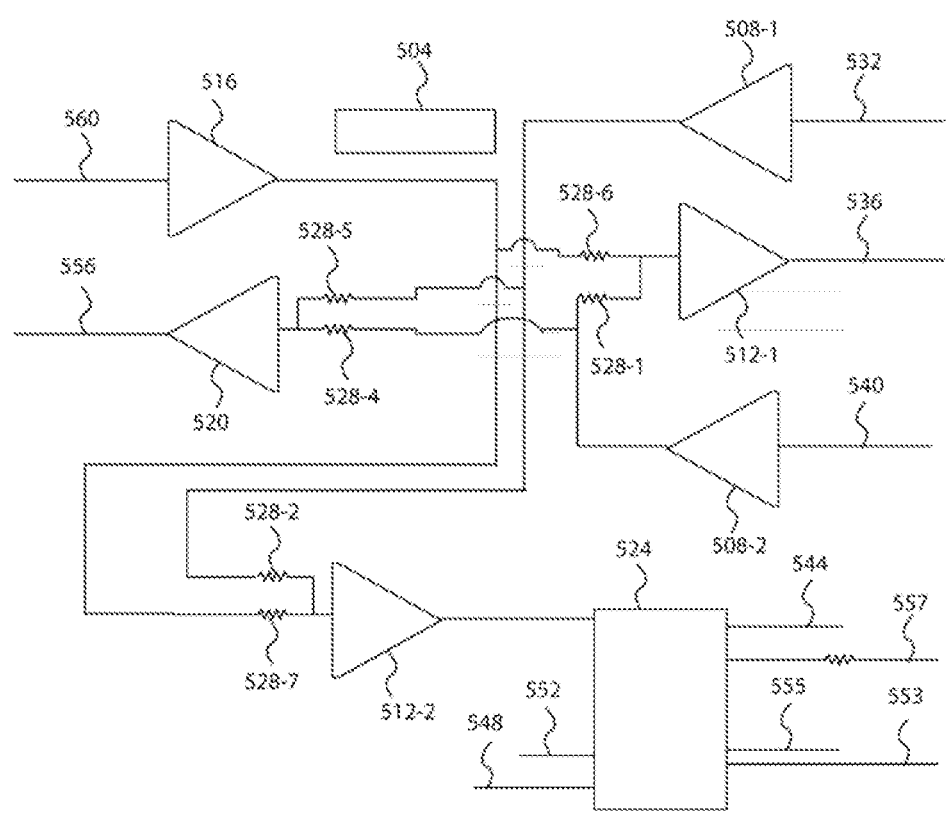

Referring next to FIGS. 5A and 5B, schematic diagrams of embodiments of the signal compounder 104 for combining two radio systems are shown. FIG. 5A shows an embodiment of the signal compounder 104. The signal compounder 104 receives a first signal from the first transceiver 108 at a first input 532. A first amplifier 508-1 amplifies the first signal. The signal compounder 104 receives a second signal at a second input 540. A second amplifier 508-2 amplifies the second signal. The signal compounder 104 receives a microphone signal from the microphone 112 at a microphone input 560. A microphone amplifier 516 amplifies the microphone signal. Amplifies can mean attenuates and/or buffers.

At a first junction 561-1, the signal compounder 104 combines the second signal with the third signal to create a first combined signal. A first driver 512-1 amplifies and/or attenuates the first combined signal, and the first combined signal is transmitted to the first transceiver 108 via a first output 536. At a second junction 561-2, the signal compounder 104 combines the first signal with the microphone signal to create a second combined signal. A second driver 512-2 amplifies and/or attenuates the second combined signal, and the second combined signal is transmitted to the second transceiver 110 via a second output 544. At a third junction 561-3, the signal compounder 104 combines the first signal and the second signal to create a third combined signal. A speaker driver 520 amplifies and/or attenuates the third combined signal, and the third combined signal is transmitted to the speaker 116 via a speaker output 556.

The signal compounder 104 also includes a plurality of resistors 528. Resistors 528 can optionally be removed to semi-permanently limit certain signals. For example, removing a first resistor 528-1 configures the signal compounder 104 so that the second signal is not transmitted to the first transceiver 108, but the second signal is still transmitted to the speaker 116. Thus a user of the second transceiver 110 could listen to communication from the first transceiver, but the other resistors 528 can be removed to limit transmission of other signals.

The signal compounder 104 also includes a power source 504. The power source 504 powers various components such as the amplifiers 508, the drivers 512, the microphone amplifier 516, and/or the speaker driver 520. The power source 504 can be a battery or powered through a connection to a radio. The power source 504, the amplifiers 508, the drivers 512, the microphone amplifier 516, the speaker driver 520, and resistors are optional. The amplifiers 508, the drivers 512, the microphone amplifier 516, and/or the speaker driver 520 help balance volume levels between different signals.

Referring next to FIG. 5B, another embodiment of the signal compounder 104 is shown. In addition to the features already described in FIG. 5A, FIG. 5B adds a PTT jumper section 524. The PTT jumper is inserted before the second output 544. The PTT jumper section 524 allows a user of the signal compounder 104 to remotely activate a push-to-talk function on the second transceiver 110. Other embodiments could place a PTT jumper section 524 to activate a push-to-talk function on the first transceiver 108 either as an alternative to, or in combination with, the PTT jumper section 524 to activate the push-to-talk function on the second transceiver 110.

Different PTT radios use different techniques to activate a transmitter in long-range radio 220. One method is to disconnect and connect the fourth output 544 from the second driver 512-2 or the microphone bias 557. Using the PTT jumper section 524, the second driver 512-2 output can be routed to a second PTT input 552. When a remote PTT button is pushed, the second PTT input 552 is connected to a first PTT input 548 and the PTT jumper section 524 will route the first PTT input 548 to the second output 544. If a bias signal from the driver 512-2 is not used, then an external bias voltage from the microphone bias 557, which may come from the second transceiver 110 can be connected to the second PTT input 552 by jumpers in jumper section 524.

Another method for telling the second transceiver 110 it is time to transmit is to use a constant voltage signal to as an input to the second transceiver 110. When a second transceiver 110 uses this technique, the output of driver 512-2 is routed through the PTT jumper section 524 and via jumpers connected to the second output 544. If an external bias is required by the second transceiver, then a jumper in the PTT jumper section 524 may connect the microphone bias 557 to the second output 544. When applicable, the second PTT input 552 is connected to either ground or power connection 555 by using jumpers in the PTT jumper section 524. The power connection 555 may come from the second transceiver. When the remote PTT button is pushed, the second PTT input 552 is connected to the first PTT input 548 and the PTT jumper section 524 will route a signal to the fourth output 553, which is connected to an input on the second transceiver 110 and notifies the second transceiver 110 to transmit.

Figure 6A:
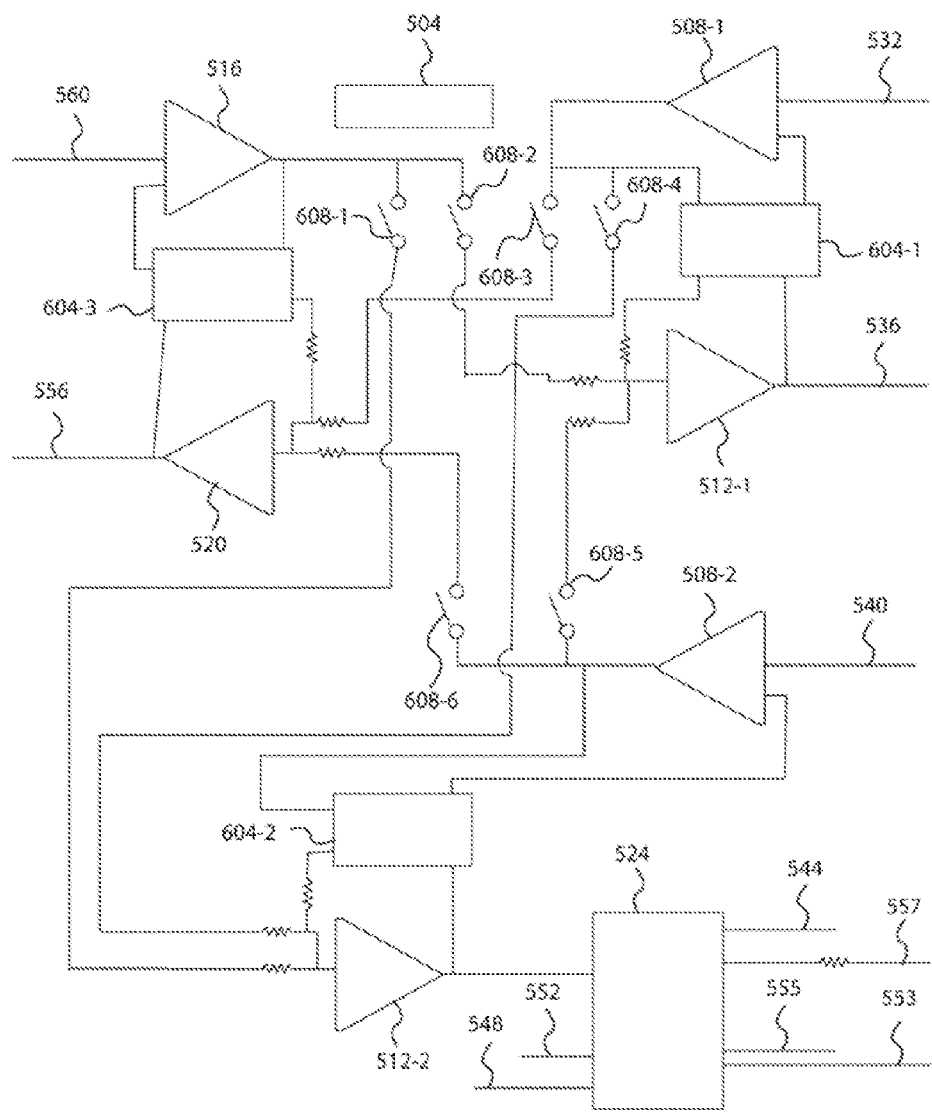
FIGS. 6A and 6B depict schematic diagrams of embodiments of the signal compounder showing switches for different mode selections.

Referring next to figure FIG. 6A, a schematic diagram of another embodiment of the signal compounder 104 is shown.

FIG. 6A is similar to FIG. 5B, but FIG. 6A has a plurality of mode switches 608 and a plurality of sidetone modules 604.

The mode switches 608 can be dynamically opened and/or closed for the signal compounder 104 to operate in different modes, such as modes described in FIGS. 3A, 3B, 3C, and 4. For example, to have the signal compounder 104 operate in the fourth mode 416 described in FIG. 4, a first mode switch 608-1 and a second mode switch 608-2 would be configured in an open state. With the first mode switch 608-1 and the second mode switch 608-2 in an open state, a signal from the microphone 112 received at the microphone input 560 is not transmitted to the first output port 536 (and thus not transmitted to the first transceiver 108) or to the second output port 544 (and thus not transmitted to the second transceiver 110). Other modes are possible through different combinations of opened and closed mode switches 608.

Sidetone in a headset 120 is feedback from the microphone 112 fed into the speaker 116 so that a user hears him or herself speaking. Sidetone is not necessary, but because of the older phone systems that had sidetone, people now expect to hear sidetone and many people prefer hearing sidetone when they speak. In the above system, sidetone may cause an echo. The echo of sidetone can be eliminated or reduced by programming radios that are connected to the signal compounder 104 to have no sidetone. When sidetone cannot be turned off, then the echo can be reduced or eliminated by using modified 2-to-4 wire converter type circuits. The 2-to-4 wire converter senses a signal sent to each radio, inverts the signal's phase 180 degrees, and adds the inverted signal after volume adjustment with the speaker signal coming from that same radio in such a way as to cancel some or all of the sidetone. This is set up such that the sidetone for the headset 120 connected to the signal compounder 104 is not canceled or that the sidetone is only generated by one of the transceivers for the headset 120 that is connected to the signal compounder 104. Sidetone modules 604 comprise the 2-to-4 wire converter or cancelation circuit. The 2-to-4 wire converter can be made either mechanically, using active circuits, or by using digital signal processing (DSP).

Figure 6B:
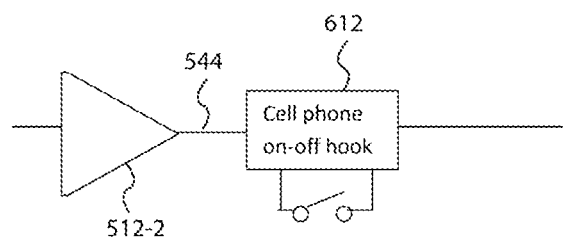

In FIG. 6B, a schematic diagram of an embodiment of a portion of the signal compounder 104 is shown with a cell phone on-off hook module 612. The cell phone on-off hook module 612 is connected to the second output 544 of FIG. 6A. The cell phone on-off hook module 612 allows a user to remotely open a telephone connection or close (i.e., "hang up") a telephone connection to a mobile phone connected to the signal compounder 104. The cell phone on-off hook module 612 can be connected with a wire to the signal compounder 104 or connected wireless, such as using Bluetooth technology.

Figure 7:
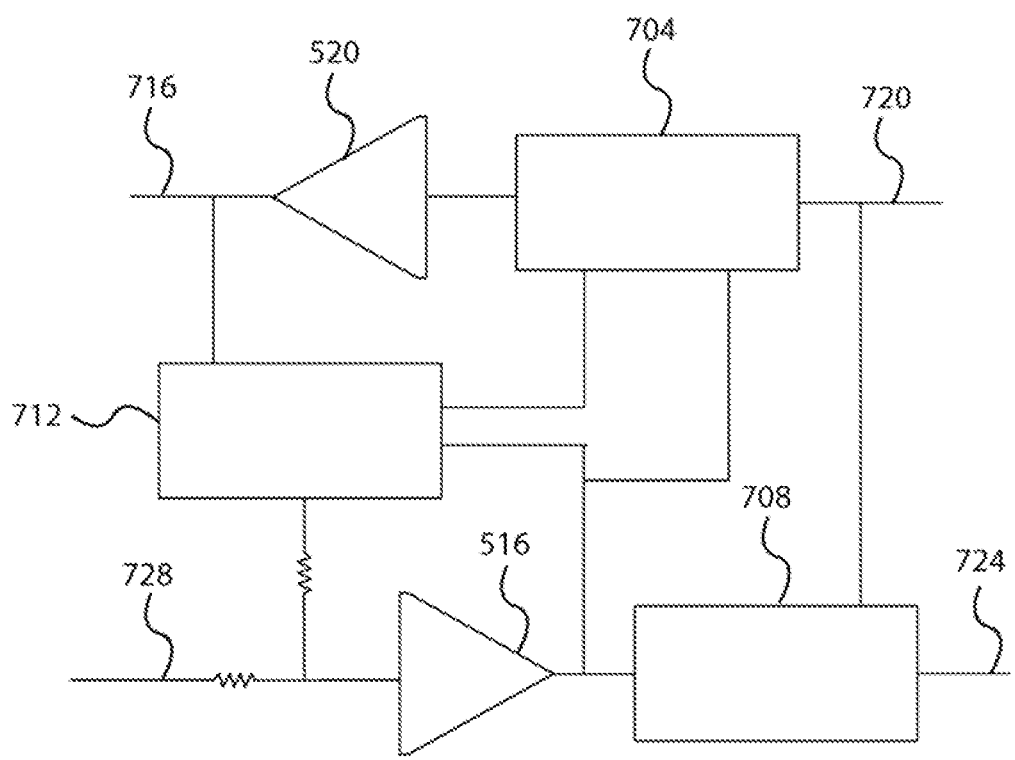
FIG. 7 depicts a schematic diagram of an embodiment for a combined in-ear microphone and speaker.

In FIG. 7, a schematic diagram of an embodiment for a combined in-ear microphone and speaker is shown. This invention covers having a combination speaker microphone in the same ear. A speaker driver 520 amplifies and/or attenuates an audio signal received at a speaker input 720 after going through a first filter section 704, and a resultant signal is transmitted to the speaker 116 via a speaker output 716. A signal from the microphone 112 is received at a microphone input 728, passes through a microphone amplifier 516, and then enters a second filter section 708. Because the speaker 116 and the microphone 112 are using the same ear on a person, audio coming out of the speaker 116 may come in on the microphone 112. To cancel or reduce the audio coming out of the speaker 116 and into the microphone 112, a signal that is transmitted to the speaker output 716 is also routed to a third filter section 712. A signal entering the third filter section 712 is delayed and adjusted to create a 180 degree phase shift to cancel the audio coming out of the speaker 116 and into the microphone 112. The third filter section 712 may also amplify or attenuate the signal before going into a summing junction to be combined with the signal coming from the microphone 112.

A signal transmitted to the speaker output 716 may be changed or distorted from going out of the speaker 116, into the ear canal, and into the microphone 112. The third filter section 712 can filter and/or modify a signal entering the third filter section 712 in such a manner as to mimic the effects of the speaker 116, the ear canal, and microphone 112 to cancel the signal transmitted to the speaker output 716. To compensate for component and/or ear canal differences, an output of microphone amplifier 516 may be used by filter section 712 to change gain, filter, and/or phase change characteristics to cancel as much of the signal transmitted from the speaker output 716 as applicable from an output of the microphone amplifier 516.

The first filter section 704 may simply pass a signal through or may filter signals in such a manner as to match the characteristics of the speaker 116. The first filter section 704 may also filter audio signals in such manner as to help the third filter section 712 cancel feedback from the speaker 116 entering the microphone 112. The first filter section 704 may also use feedback from the microphone amplifier 516 to adjust filtering characteristics of the first filter section 704. The first filter section 704 may also send data to the third filter section 712 so that the third filter section 712 may change filtering characteristics as applicable. The second filter section 708 may modify an output of the microphone amplifier 516 so that a signal transmitted to a microphone output 724 more resembles natural speech and/or is more recognizable for speech recognition systems. The second filter section 708 may use a signal received at the speaker input 720 to change characteristics of a signal received from the microphone amplifier 516 to more closely match natural speech of user of the microphone 112.

In some embodiments, the speaker 115 and the microphone 112 are both in an auditory canal portion of the same ear. The microphone 112 transduces compressed air waves (i.e., sound) in the ear. In further embodiments, the microphone 112 and the speaker 115 have similar ranges. For example, the microphone 112 can transduce audio frequencies in a range that is audible to a human ear, i.e., from 20 to 20,000 Hertz. Or the microphone can transduce a subset of frequencies audible to a human ear; for example from 100 to 10,000 Hertz.

Figure 8:
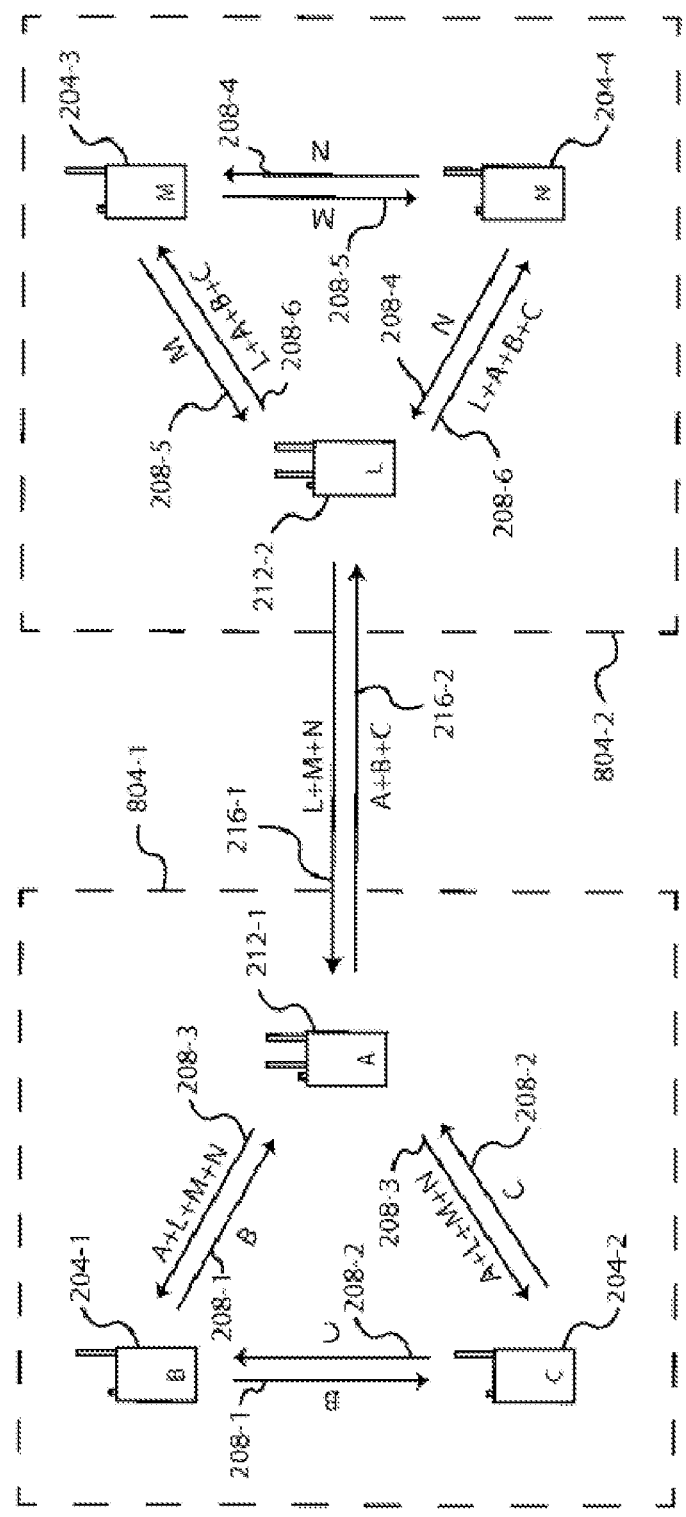
FIG. 8 depicts a block diagram of an embodiment of a first multivoice system combined with a second multivoice system using a dual transceiver.

FIG. 8 depicts a block diagram of an embodiment of a first multivoice system combined with a second multivoice system using a dual transceiver 212. A first multivoice radio 204-1, a second multivoice radio 204-2 and a first SLR radio 212-1 operate in a first multivoice system and form a first synchronized group 804-1. A synchronized group 804 is one or more multivoice radios that are synced in time (e.g., according to TDMA) to communicate with each other. A second SLR radio 212-2, a third multivoice radio 204-3, and a fourth multivoice radio 204-4 operate in a second multivoice system and form a second synchronized group 804-2. The first SLR radio 212-1 and the second SLR radio 212-2 are also in radio communication with each other. The SLR radios 212 each comprise a signal compounder 104. The signal compounder 104 combines signals received in each SLR radio 212 so that the first multivoice radio 204-1 and the second multivoice radio 204-2 in the first synchronized group 804-1 can receive and communicate with the third multivoice radio 204-3 and the fourth multivoice radio 204-4 in the second synchronized group 804-2. Thus, by linking the first SLR radio 212-1 and the second SLR radio 212-2 a larger conferencing system is formed.

Figure 9:
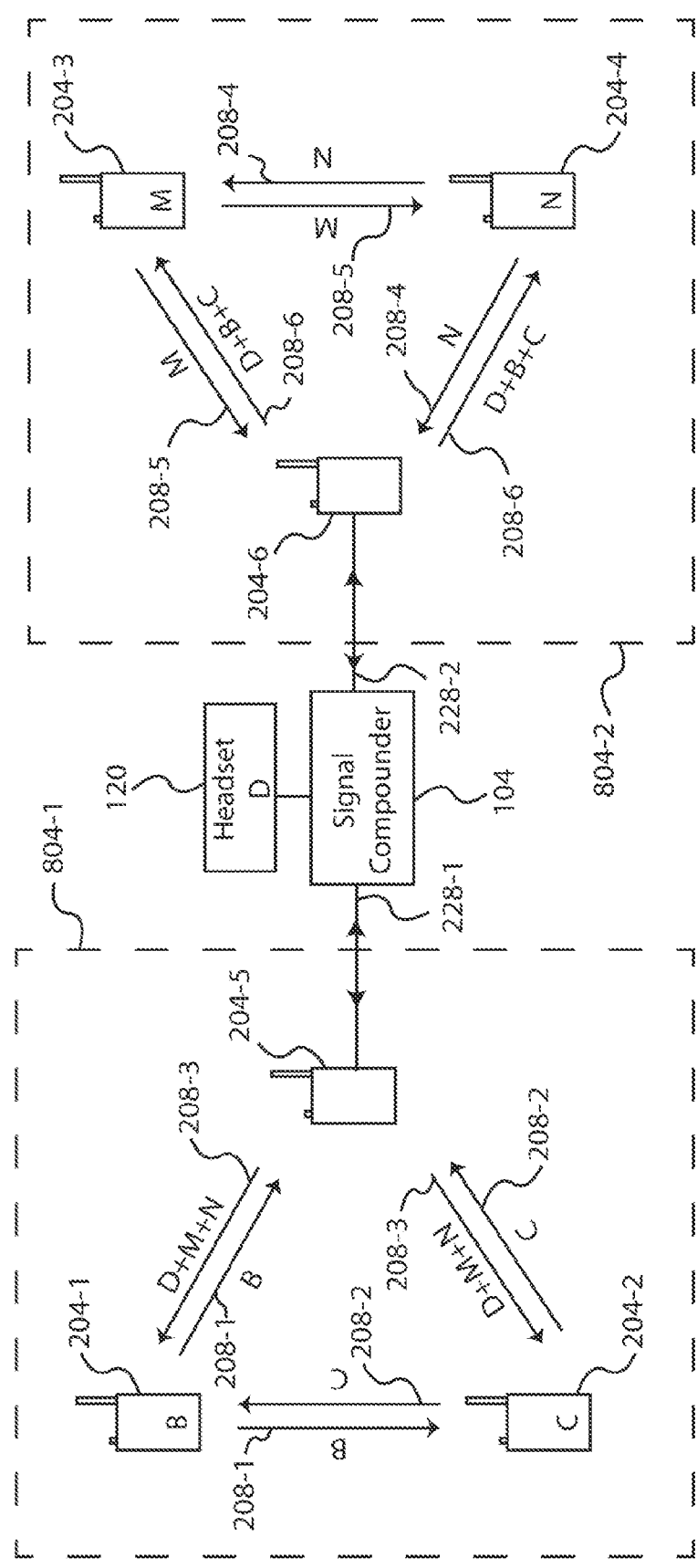
FIG. 9 depicts a block diagram of an embodiment of a first multivoice system combined with a second multivoice system using an external signal compounder.

FIG. 9 depicts a block diagram of an embodiment of a first multivoice system combined with a second multivoice system using an external signal compounder 104. The first multivoice radio 204-1, the second multivoice radio 204-2, and a fifth multivoice radio 204-5 form a first synchronized group 804-1. The third multivoice radio 204-3, the fourth multivoice radio 204-4, and a sixth multivoice radio 204-6 form a second synchronized group 804-2. The signal compounder 104 is connected through a first wired connection 228-1 to the fifth multivoice radio 204-5. The signal compounder is connected through a second wired connection 228-2 to the sixth multivoice radio 204-6. The signal compounder 104 is also connected to a headset 120. The signal compounder 104 can combine and limit signals between multivoice radios 204 in the first synchronized group 804-1 and the second synchronized group 804-2 in similar ways as the signal compounder 104 functioned in previous embodiments for combining short-range radios with long-range radios. For example, users of each multivoice radio 204 could hear communications from the other multivoice radios 204, thus creating a larger conferencing system. In another example, a user speaking into the headset could communicate with the first synchronized group 204-1, or the second synchronized group 804-2, or both. In a further example, a user of the signal compounder 104 could toggle a switch so that the first synchronized group 804-1 could hear the communication in the second synchronized group 804-2, but the second synchronized group 804-2 could not hear the communication in the first synchronized group 804-1. The signal compounder 104 may include buttons, switches, toggles, etc. that can be used by a user to switch between any of the operational modes described herein.

Figure 10A:
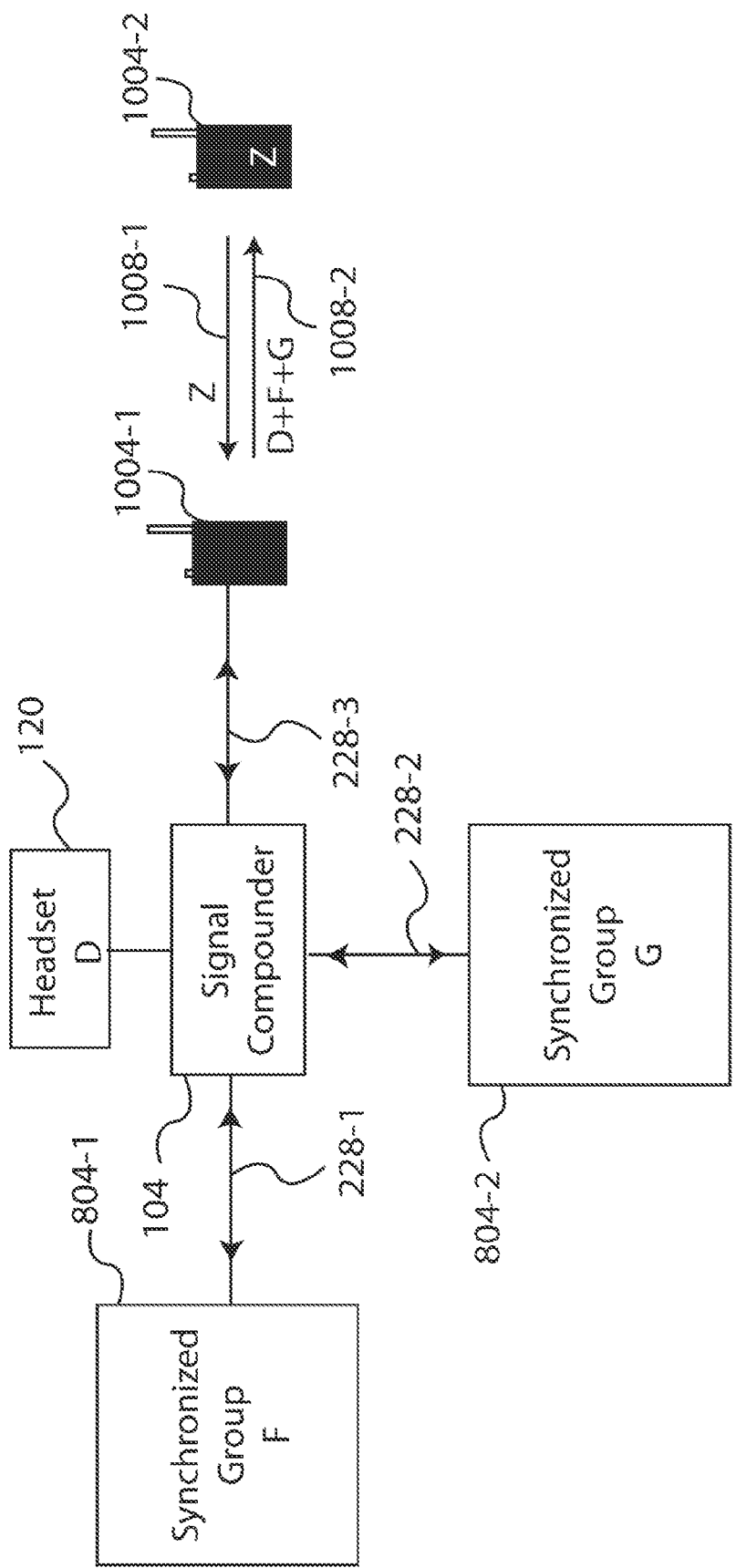
FIG. 10A depicts a block diagram of an embodiment of a signal compounder combining two multivoice systems and a duplex radio.

FIG. 10A depicts a block diagram of an embodiment of a signal compounder 104 combining two multivoice systems and a duplex radio 1004. FIG. 10A is similar to FIG. 9, but the signal compounder 104 in FIG. 10A is also connected to a first duplex radio 1004-1 through a third wired connector 228-3. In one embodiment, the first duplex radio 1004-1 is a mobile phone. The first duplex radio 1004-1 is in communication with a second duplex radio 1004-2. The first duplex radio 1004-1 receives a first duplex signal 1008-1 from the second duplex radio 1004-2. The first duplex radio 1004-1 transmits a second duplex signal 1008-2 to the second duplex radio 1004-2.

The signal compounder 104, as in FIG. 9, can receive and transmit signals to and from the first synchronized group 804-1 and/or the second synchronized group 804-2. In FIG. 10A, the signal compounder 104 determines which audio signals go to the first synchronized group 804-1, the second synchronized group 804-2, the headset 120, and the first duplex radio 1004-1. Thus, for example, users of radios in the first synchronized group 804-1 can hear communications from users in the second synchronized group 804-2 as well as a user of the second duplex radio 1004-2.

In another example, a user of the second duplex radio 1004-2 can hear only the user on the headset 120, and not users in the synchronized groups 804. But users in the synchronized groups 804 can hear the user of the second duplex radio 1004-2. This is what a negotiator in a hostage situation wants to occur when the negotiator has a headset 120 connected to the signal compounder 104. In a hostage scenario example, users of multivoice radio systems are SWAT team members, including sharpshooters, and the negotiator wears the headset 120 connected to the signal compounder 104. This allows the SWAT team members to hear what a suspect is saying while the suspect is speaking on the other side of the cell phone call (i.e., on the second duplex radio 1004-2), but the suspect can hear only what the negotiator is saying. The negotiator can hear both what the suspect is saying and what members of the SWAT team are saying, including the sharpshooters.

In another variation of the example above about the negotiator, the negotiator can send a robot into a building where the suspect has taken a hostage. The robot can have a robot-radio system comprising a conference room microphone and speaker system connected to the first multivoice radio 204-1 that is part of the first synchronized group 804-1. The SWAT team members have radios that are parts of the second synchronized group 804-2. Thus there are two different independent radio conferencing systems connected to the signal compounder 104 that is connected to the headset 120. The negotiator, using the headset 120, can hear the suspect as part of the first synchronized group 804-1 using the robot-radio system's microphone. The negotiator can communicate with the suspect as part of the first synchronized group 804-1 using the robot-radio system's speaker. The negotiator can also hear the SWAT team members in the second synchronized group 804-2. Further, the SWAT team members can hear what the suspect is saying. But the suspect communicating in the first synchronized group 804-1 hears only what the negotiator is saying. Additionally, switch type features as shown in FIG. 6A can be added to the signal compounder 104 to isolate voice paths until they are wanted.

In other embodiments, the signal compounder 104 is embedded in one or more of the multivoice radios 204 such that combinations can be controlled digitally. In still another embodiment, the functionality of a multivoice radio 204 can be embedded in a cell phone or full-duplex radio. The signal compounder 104 may also be embedded in a cell phone, full duplex radio, or a multivoice radio 204.

The signal compounder 104 can combine two or more different radio systems, or have combined modes as described herein. The signal compounder 104 can also include various combining algorithms, filters, echo cancelation, etc. The signal compounder 104 may also multiplex signals from the various transceivers and/or the microphone 112 as well as demultiplex signals from the transceivers and send them to the speaker 116. The signal compounder 104 can also be used to implement wireless conference techniques and combine two different wireless conferencing systems so that more people can be on a larger conferencing system. The signal compounder 104 may also combine signals from the first transceiver 108 and/or the second transceiver 110 along with signals from the speaker 116 and microphone 112. The signal compounder 104 may include buttons, switches, toggles, etc. that can be used by a user to switch between different operational modes described herein. The duplex combiner may use analog or digital techniques to combine signals.

Figure 10B:
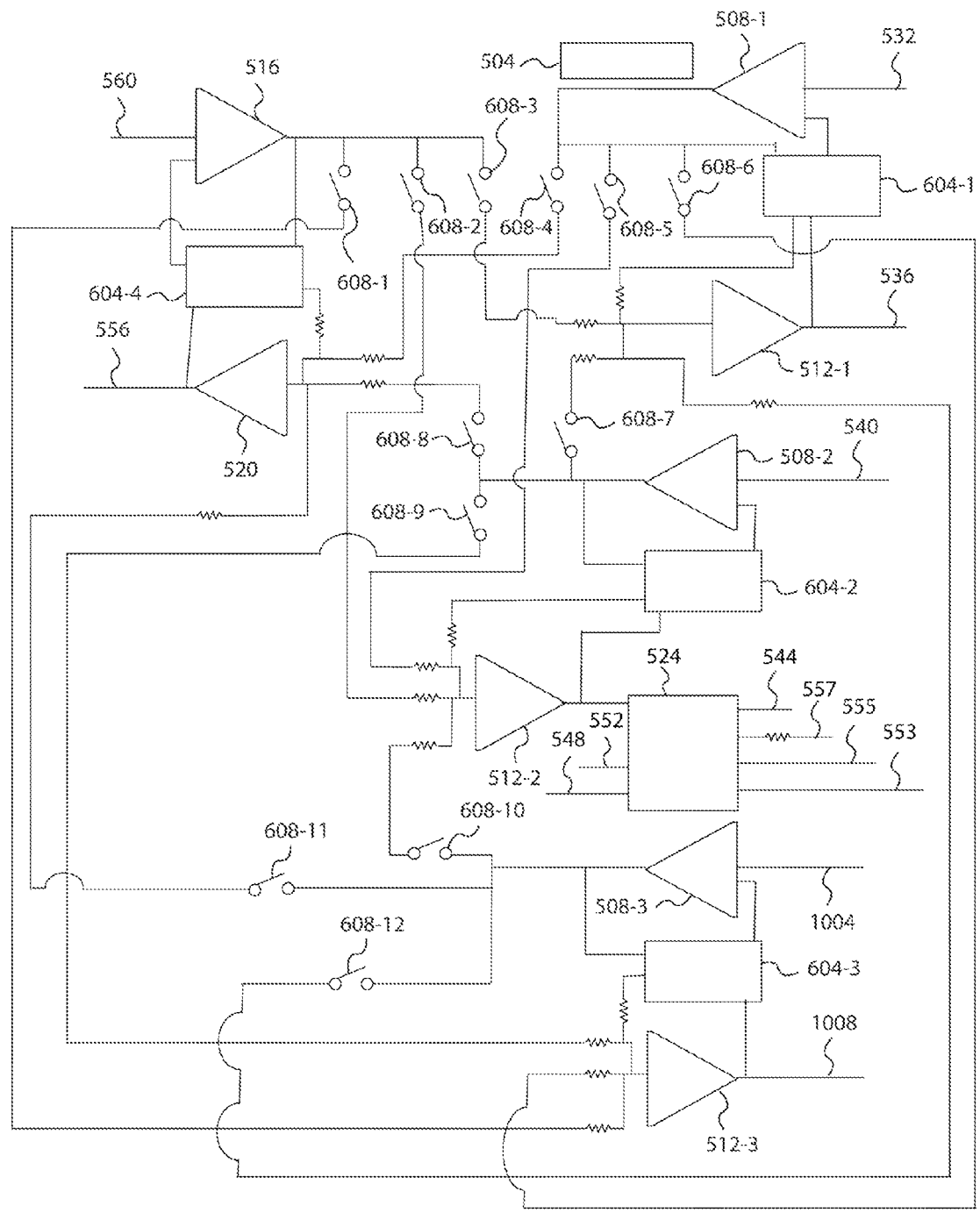
FIG. 10B depicts a schematic diagram of an embodiment of a signal compounder combining two multivoice systems and a duplex radio.

FIG. 10B depicts a schematic diagram of an embodiment of a signal compounder 104 combining three radio systems. FIG. 10B is similar to FIG. 6A, but FIG. 10B has the addition of connecting to a third transceiver. In FIG. 10A, the third transceiver is the first duplex radio 1004-1. In FIG. 10B, the signal compounder 104 receives a third signal from the third transceiver at a third input 1004. A third amplifier 508-3 amplifies the third signal. The signal compounder 104 transmits a signal to the third transceiver via a third output 1008. The signal compounder 104 has a plurality of switches 608 used to control the combination of signals.

Inputs and outputs can be combined into ports for connecting to a transceiver. For example, the signal compounder 104 connects to the first transceiver 108 using a first port, the first port being used to connect the first transceiver 108 to the first input 532 and the first output 536. Likewise, a second port is used to connect the second transceiver 110 to the second input 540 and the second output 544. If a PTT jumper section 524 is used, as shown in this embodiment, the second port can also be used to connect the second transceiver 110 to the optional bias 557, the power connection 555, and/or the fourth output 553. A third port is used to connect the third transceiver to the third input 1004 and the third output 1008. A fourth port is used to connect the headset 120 to the microphone input 560 and speaker output 556. In some embodiments, the first port, the second port, the third port, and the fourth port are all separate ports.

Figure 11:
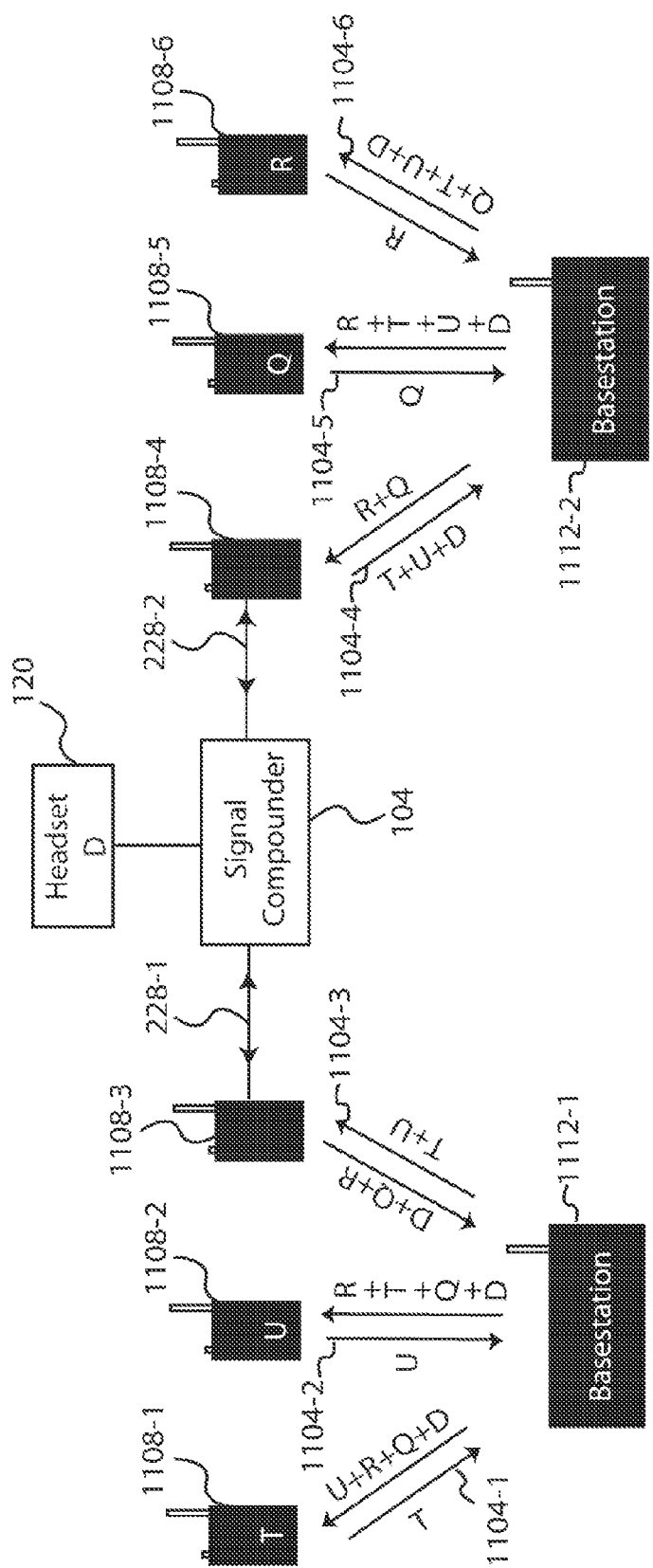
FIG. 11 depicts a block diagram of an embodiment of a signal compounder combining two duplex radio systems that use base stations.

FIG. 11 depicts a block diagram of an embodiment of a signal compounder 104 combining two duplex radio systems that use base stations. A first duplex radio 1108-1, a second duplex radio 1108-2, and a third duplex radio 1108-3 communicate with each other via a first base station 1112-1 and form a first duplex system. A fourth duplex radio 1108-4, a fifth duplex radio 1108-5, and a sixth duplex radio 1108-6 communicate with each other via a second base station 1112-2 and form a second duplex system. The duplex radios 1108 and the base stations 112 transmit signals for communication to and from the bases station 1112 referred to as base station signals 1104. A signal compounder 104 communicates with the third duplex radio 1108-3 through a first wired connection 228-1. the signal compounder 104 communicates with the fourth duplex radio 1108-4 through a second wired connection 228-2. The first wired connection 228-1 can connect to a headset port of the third duplex radio 1108-3 and/or an auxiliary port of the third duplex radio 1108-3. The second wired connection 228-2 can connect to a headset port of the fourth duplex radio 1108-4 and/or an auxiliary port of the fourth duplex radio 1108-4. The signal compounder 104 is also connected to a headset 120.

The signal compounder 104 combines signals from the headset 120, the first duplex system, and the second duplex system in similar ways as has been disclosed in previous figures and embodiments. For example, communication from a user of the first duplex radio 1108-1 is transmitted from the first duplex radio 1108-1 to the first base station 1112-1; from the first base station 1112-1 to the third duplex radio 1108-3; from the third duplex radio 1108-3 to the signal compounder 104 via the first wired connector 228-1; from the signal compounder 104 to the fourth duplex radio 1108-4 via the second wired connector 228-2; from the fourth duplex radio 1108-4 to the second base station 1112-2; and from the second base station 1112-2 to the fifth duplex radio 1108-5 and the sixth duplex radio 1108-6. Thus users in the second duplex system can hear communication from users in the first duplex system.

Figure 12:
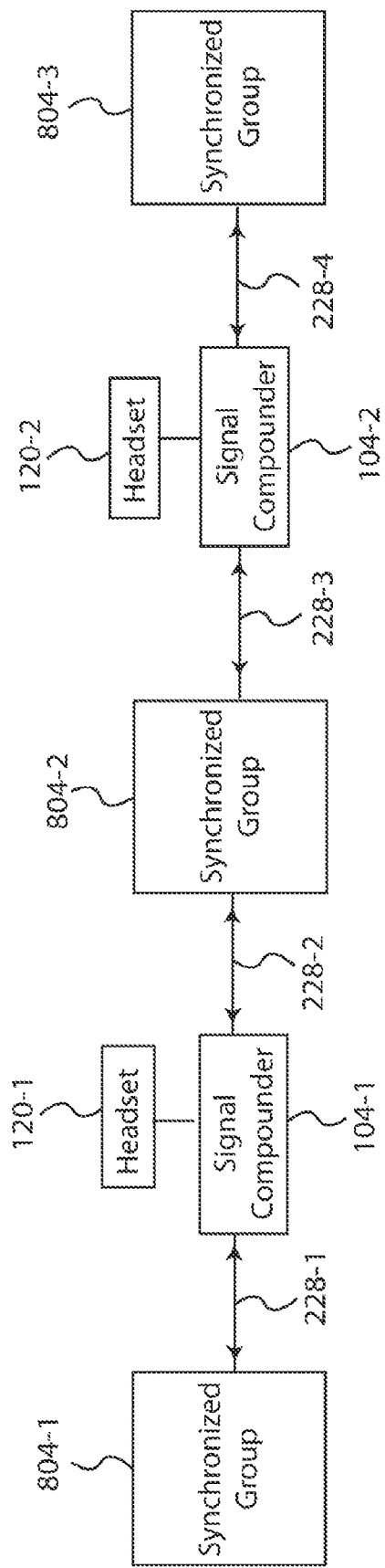
FIG. 12 depicts a block diagram of an embodiment using two signal compounders to combine three multivoice systems.

FIG. 12 depicts a block diagram of an embodiment using two signal compounders 104 to combine three multivoice systems. A radio in a first synchronized group 804-1 is connected via a first wired connection 228-1 to a first signal compounder 104-1. The first signal compounder 104-1 is connected to a first radio in a second synchronized group 804-2 via a second wired connection 228-2. The first signal compounder 104-1 is connected to a first headset 120-1. Thus the first synchronized group 804-1, the second synchronized group 804-2, and the first headset 120-1 can communicate similarly as described in FIG. 9.

A second signal compounder 104-2 connects to a second radio in the second synchronized group 804-2 via a third wired connection 228-3. The second compounder 104-2 connects to a radio in a third synchronized group 804-3 via a fourth wired connector 228-2. The second signal compounder 104-2 is connected to a second headset 120-2. In this embodiment, users in the first synchronized group 804-1 can communicate, via the signal compounders 104 and the second synchronized group 804-2, with users in the third synchronized group 804-3. Connecting multiple synchronized groups 804 not only increases a number of users that can communicate with each other, but can also extend a range that users of the synchronized groups 804 can communicate with each other. For example, if a radio in the first synchronized group 804-1 is out of range of the third synchronized group 804-3, but the second synchronized group 804-2 is within range of both the first synchronized group 804-1 and the second synchronized group 804-2, then the first signal compounder 104-1 can combine the first synchronized group 804-1 and the second synchronized group 804-2. The second signal compounder 104-2 can combine the second synchronized group 804-2 and the third synchronized group 804-3. This may result in users of radios in the first synchronized group 804-1 being able to communicate with users of radios in the third synchronized group 804-3, even though the users of radios in the first synchronized group 804-1 are out of range of users of radios in the third synchronized group 804-3. Adding more synchronized groups 804 and signal compounders 104 can increase a number of users being able to communicate with each other in a conference-like manner.

When a signal compounder 104 is connected to the first transceiver 108 and the second transceiver 110, there is a possibility that the first transceiver 108 and the second transceiver 110 will interfere with each other. One solution is to use filter designs to reduce the interference. Another solution is to have the first transceiver 108 and the second transceiver 110 transmit at the same time.

Figure 13:
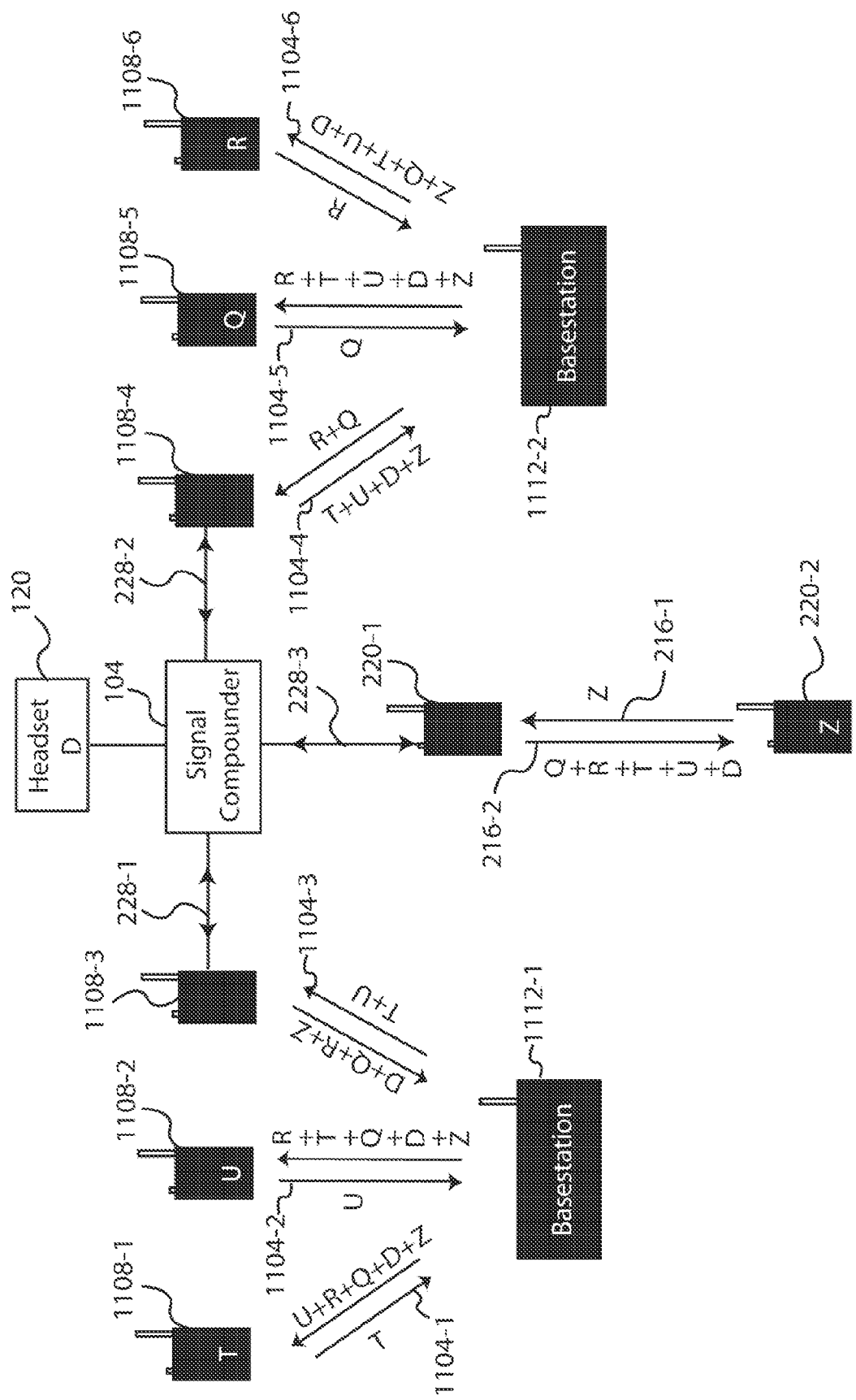
FIG. 13 depicts a block diagram of an embodiment of a signal compounder combining two duplex systems that use base stations with a long-range radio.

FIG. 13 depicts a block diagram of an embodiment of signal compounder 104 combing two duplex systems using bases stations with a long-range radio 220. A first duplex radio 1108-1, a second duplex radio 1108-2, and a third duplex radio 1108-3 communicate with each other via a first base station 1112-1 and form a first duplex system. A fourth duplex radio 1108-4, a fifth duplex radio 1108-5, and a sixth duplex radio 1108-6 communicate with each other via a second base station 1112-2 and form a second duplex system. The duplex radios 1108 and the base stations 112 transmit signals for communication to and from the bases station 1112 referred to as base station signals 1104. A signal compounder 104 communicates with the third duplex radio 1108-3 through a first wired connection 228-1. the signal compounder 104 communicates with the fourth duplex radio 1108-4 through a second wired connection 228-2. The first wired connection 228-1 can connect to a headset port of the third duplex radio 1108-3 and/or an auxiliary port of the third duplex radio 1108-3. The second wired connection 228-2 can connect to a headset port of the fourth duplex radio 1108-4 and/or an auxiliary port of the fourth duplex radio 1108-4. The signal compounder 104 is connected to a headset 120. The signal compounder 104 is also connected to a first long-range radio 120-1 via a third wired connector 228-3. The first long-range radio 220-1 transmits and receives long-range signals 216 to and from a second long-range radio 220-2.

The signal compounder 104 combines signals from the headset 120, the first duplex system, the second duplex system, and the first long-range radio 220-1 in similar ways as disclosed in previous figures and embodiments. For example, communication from a user of the first duplex radio 1108-1 is transmitted from the first duplex radio 1108-1 to the first base station 1112-1; from the first base station 1112-1 to the third duplex radio 1108-3; from the third duplex radio 1108-3 to the signal compounder 104 via the first wired connector 228-1; from the signal compounder 104 to the first long-range radio 220-1 via the third wired connector 228-1; and from the first long-range radio 220-1 to the second long-range radio 220-2. Thus a user of the second long-range radio 220-2 can hear communication from users in the first duplex system, the second duplex system, and the headset 120. And users in the duplex systems can hear communication from the user of the second long-range radio 220-2.

Figure 14:
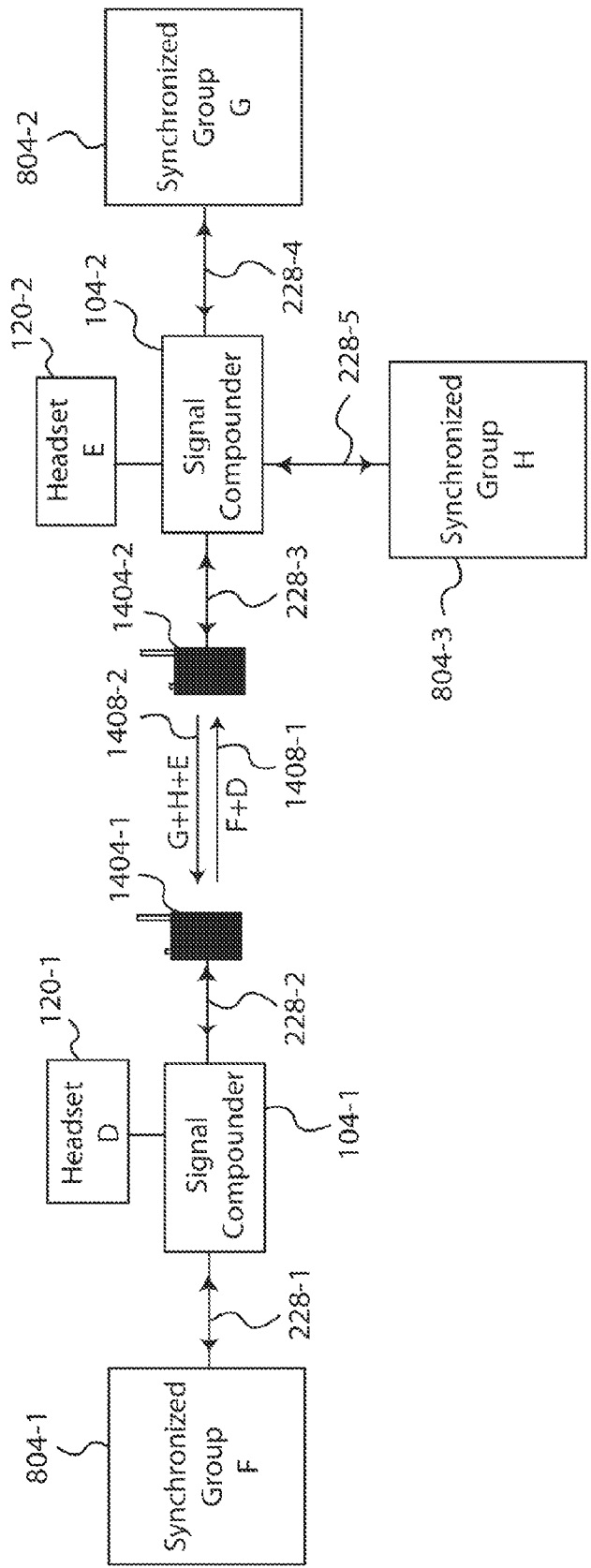
FIG. 14 depicts a block diagram of two signal compounder combining three multivoice systems with use of duplex radios.

Referring next to FIG. 14, a block diagram of an embodiment of two signal compounders 104 combining three multivoice systems with use of duplex radios is shown. A first signal compounder 104-1 is connected to a radio in a first synchronized group 804-1. The first signal compounder 104-1 is connected to a first headset 120-1. The first signal compounder 104-1 is connected to a first duplex radio 1401-1. The first duplex radio 1401-1 is in communication with a second duplex radio 1404-2. The duplex radios 1404 in this embodiment are mobile phones and the first duplex radio 1404-1 sends and receives wireless telephone signals 1408 to each other either directly or through cell towers. The second duplex radio 1404-2 is connected to a second signal compounder 104-2. The second signal compounder 104-2 is connected to a radio in a second synchronized group 804-2. The second signal compounder 104-2 is connected to a radio in a third synchronized group 804-3. The second signal compounder 104-2 is connected to a second headset 120-2. This system not only increases a number of user that can communicate on a combined system, using an embodiment such as this can also increase a range, or distance, between user in the combined system. For example, if the first synchronize group 804-1 is in Salt Lake City, Utah and the second synchronized group 804-2 and the third synchronized group 804-3 are in New York, N.Y., then the first synchronized group 804-1 would normally be out of communication range of range of the second synchronized group 804-2 and the third synchronized group 804-3 when using multivoice radios 204. But by connecting a duplex radio 1404 (such as cell phones) to each of the signal compounders 104, users in the first synchronized group 804-1 can communicate in a conference-like manner with users in the second synchronized group 804-2 and the third synchronized group 804-3.

Figure 15:
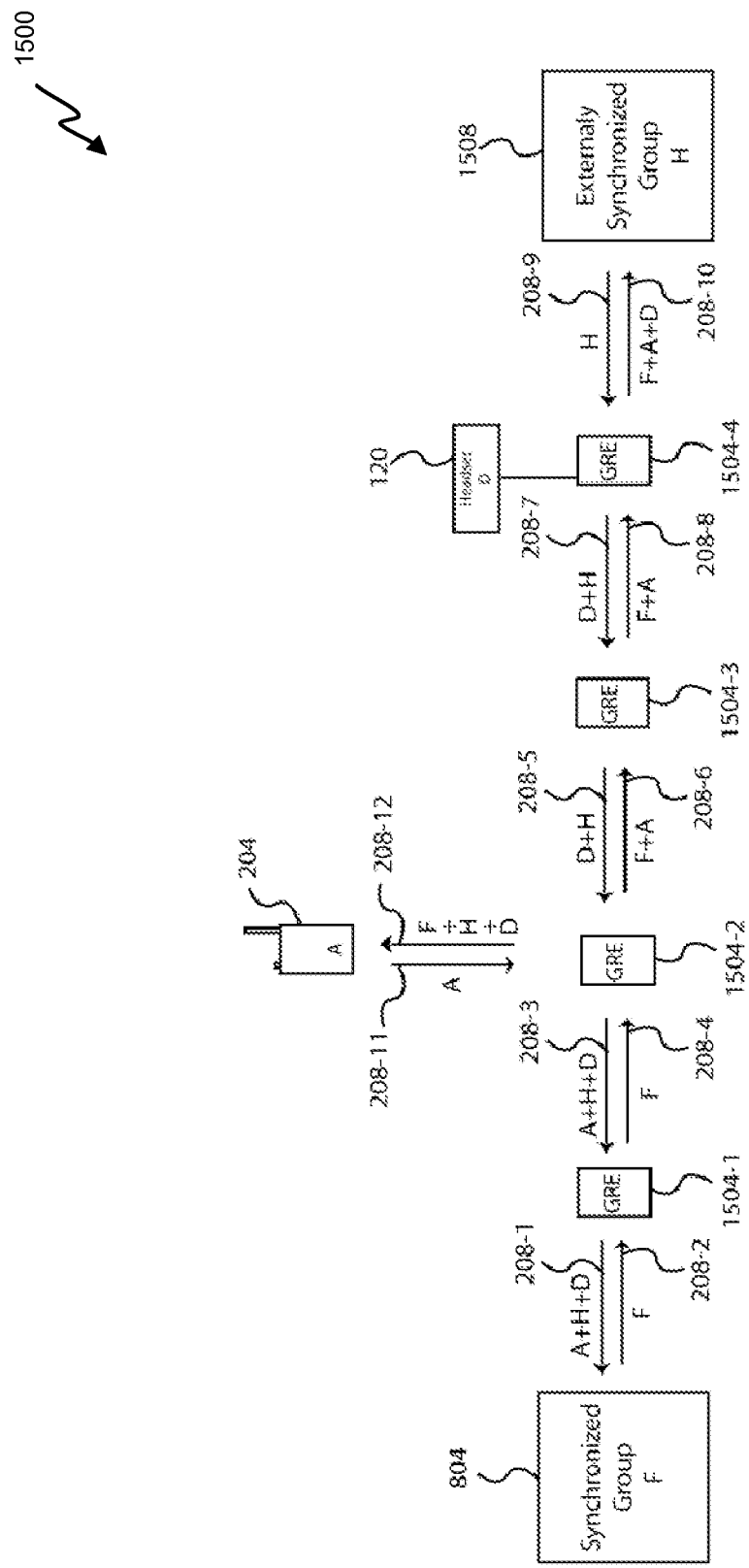
FIG. 15 depicts a block diagram of group range extenders used to increase a range of a multivoice system.

In FIG. 15, a block diagram of group range extender system 1500 used to increase a range of a multivoice system is shown. A multivoice radio system uses time division multiplexing. A given time period may be divided into a plurality of different transmission slots. For example, a transmission slot could be about three milliseconds and there could be eight transmission slots for a twenty-four millisecond time period. Radios can be categorized as either a master or slave. A master assigns itself and other radios to a transmission slot. A slave receives a transmission slot assignment from a master. A multivoice radio transmits during the radio's assigned transmission slot and receives during the remainder of the given time period. Table I below shows an example of an embodiment of a multivoice system with eight transmission slots and three multivoice radios 204. Other embodiments could have different number of transmission slots, such as five, six, seven, nine, ten, eleven, twelve, or thirteen. In one embodiment one or more transmission slots are used for transmission of data other than audio. In another embodiment, one or more transmission slots are used for communication between a master of a first multivoice radio system and a master of a second multivoice radio system.

In Table I, a sample transmission slot assignment is shown. In this example, the third multivoice radio 204-3 acts as the master and assigned itself to transmission slot 1. The third multivoice radio 204-3 assigned the first multivoice radio 204-1 to transmission slot 2. The third multivoice radio 204-3 assigned the second multivoice radio 204-2 to transmission slot 3. In this example, the third multivoice radio 204-3 would transmit during transmission slot 1 and the first multivoice radio 204-1 and the second multivoice radio 204-2 would receive. During transmission slot 2, the first multivoice radio 204-1 transmits and the second multivoice radio 204-2 and the third multivoice radio 204-3 receive. During the transmission slot 3, the second multivoice radio 204-2 transmits and the third multivoice radio 204-3 and the first multivoice radio 204-1 receive. Since transmission slots 4-8 are empty, the first multivoice radio 204-1, the second multivoice radio 204-2, and the third multivoice radio 204-3 receive (nothing) and wait until after transmission slot 8 ends and transmission slot 1 begins.

TABLE I

Sample Transmission Slot Assignments in a Multivoice Radio System

| Transmission Slot | Radio |
| --- | --- |
| 1 | 204-3 (Master) |
| 2 | 204-1 (Slave) |
| 3 | 204-2 (Slave) |
| 4 | (empty) |
| 5 | (empty) |
| 6 | (empty) |
| 7 | (empty) |
| 8 | (empty) |

In Table II, a sample transmission slot assignment for a multivoice radio system with nine transmission slots is shown. In this example, the third multivoice radio 204-3 acts as the master and assigned itself to transmission slot 1. The third multivoice radio 204-3 assigned the first multivoice radio 204-1 to transmission slot 2. The third multivoice radio 204-3 assigned the second multivoice radio 204-2 to transmission slot 3. This multivoice radio system also uses a ninth transmission slot for transmitting data. In one embodiment, only a master can transmit in slot 9. In another embodiment, any radio can transmit in slot 9.

TABLE II

Sample Transmission Slot Assignments in a Multivoice Radio System

| Transmission Slot | Radio |
| --- | --- |
| 1 | 204-3 (Master) |
| 2 | 204-1 (Slave) |
| 3 | 204-2 (Slave) |
| 4 | (empty) |
| 5 | (empty) |
| 6 | (empty) |
| 7 | (empty) |
| 8 | (empty) |
| 9 | Data |

In FIG. 9, the fifth multivoice radio 204-5 and the sixth multivoice radio 204-6 are both masters so that the fifth multivoice radio 204-5 and the sixth multivoice radio 204-6 transmit at the same time. In FIG. 15 a plurality of Group Range Extenders (GREs) 1504 are shown. In one embodiment, a GRE 1504 includes a first multivoice transceiver, a second multivoice transceiver, and functionality similar to the signal compounder 104. The first multivoice transceiver is a slave and the second multivoice transceiver is a master. But in this embodiment, the slave of a GRE 1504 does not synchronize with the master of the same GRE 1504. Instead, when a GRE 1504 is first activated, the slave of the GRE 1504 searches for a master to synchronize with. After the slave of the GRE 1504 has found a master to synchronize with, then the master of the GRE 1504 activates and starts searching for slaves to synchronize.

FIG. 15 further depicts a synchronized group 804 and a first GRE 1504-1. The first GRE 1504-1 has a first transceiver that is a master and a second transceiver that is a slave. The slave of the first GRE 1504-1 synchronizes with a master in the first synchronized group 804. The master of the first GRE 1504-1 then activates and searches for slaves. When a slave of a second GRE 1504-2 activates, the slave of the second GRE 1504-2 synchronizes with the master of the first GRE 1504-1. A master of the second GRE 1504-2 then activates and searches for slaves. A multivoice radio 204 is a slave looking for a master to synchronize with. When the master of the second GRE 1504-2 activates, the master of the second GRE 1504-2 discovers the multivoice radio 204 and assigns the multivoice radio 204 a transmission slot (i.e., the multivoice radio 204 and the master of the second GRE 1504-2 become synchronized). A slave of a third GRE 1504-3 activates, searches for a master, and synchronizes with the master of the second GRE 1504-2. A master of the third GRE 1504-2 then activates and searches for slaves. A slave of a fourth GRE 1504-4 activates, searches for a master, and synchronizes with the master of the third GRE 1504-3. A master of the fourth GRE 1504-2 then activates and searches for slaves. A user attaches a headset 120 to the fourth GRE 1504-4. Radios in an externally synchronized group 1508 are slaves looking for a master. The radios in the externally synchronized group 1508 synchronize with the master of the fourth GRE 1504-4. Thus users of radios in the externally synchronized group 1508, the multivoice radio 204, radios of the synchronized group 804, and the headset 120 can communicate in a conference-like manner with each other. Switches on the GREs 1504 can be used to limit transmission of certain signals similarly to the signal compounder 104. For example, a switch on the fourth GRE 1504-4 could mute the transmission from the microphone 112 of the headset 120 but allow a user of the headset 120 to monitor communication within the group range extender system 1500. GREs 1504 synchronized with each other and the synchronized group maintain the security of the system.

As an example of how GREs 1504 could be implemented is when a SWAT team enters a building, such as a Casino, the cement walls, floors, and other construction materials can inhibit radio signals from getting out of the building. This can mean that the SWAT team members can lose radio communication to support outside the building. The support outside the building, as well as the SWAT team members before the SWAT team members enter the building are part of the synchronized group 804. By using GREs 1504, a SWAT team can maintain communication with others outside the building and/or inside the building. As the SWAT team members enter the building, one of the SWAT team members may activate and drop, place, or even stick to a wall a first GRE 1504-1. A slave of the first GRE 1504-1 synchronizes with a master of the synchronized group 804. The master of the first GRE 1504-1 then activates and looks for slaves. As radios of the SWAT team members lose contact with the synchronized group 804, the radios of the SWAT team members start looking for another master and synchronize with the master of the first GRE 1504-1. The radios of the SWAT team members are an externally synchronized group 1508. Thus the SWAT team members can maintain communication with the support outside the building by communication through the first GRE 1504-1. As the SWAT team goes deeper into the building, the SWAT team may need to activate a second GRE 1504-2. A slave of the second GRE 1504-2 searches for a master to synchronize with and synchronizes with the master of the first GRE 1504-1. A master of the second GRE 1504-1 is then activated and starts searching for slaves. As the radios of the SWAT team members lose contact with the first GRE 1504-1, the radios of the SWAT team members start looking for another master and synchronize with the master of the second GRE 1504-2. This process continues as more GREs 1504 are placed. If a first member of the SWAT team left the SWAT team to exit the building, a radio of the first member of the SWAT team would lose communication with the second GRE 1504-1 and start looking for a master. The radio of the first member of the SWAT team would find and synchronize with the master of the first GRE 1504-1, thus enabling the first member of the SWAT team continued radio communication with the other members of the SWAT team and the support outside the building.

In another embodiment, a GRE 1504 may have only one transceiver instead of two. A GRE 1504 with only one transceiver would then transmit twice in a given time period.

Figure 16A:
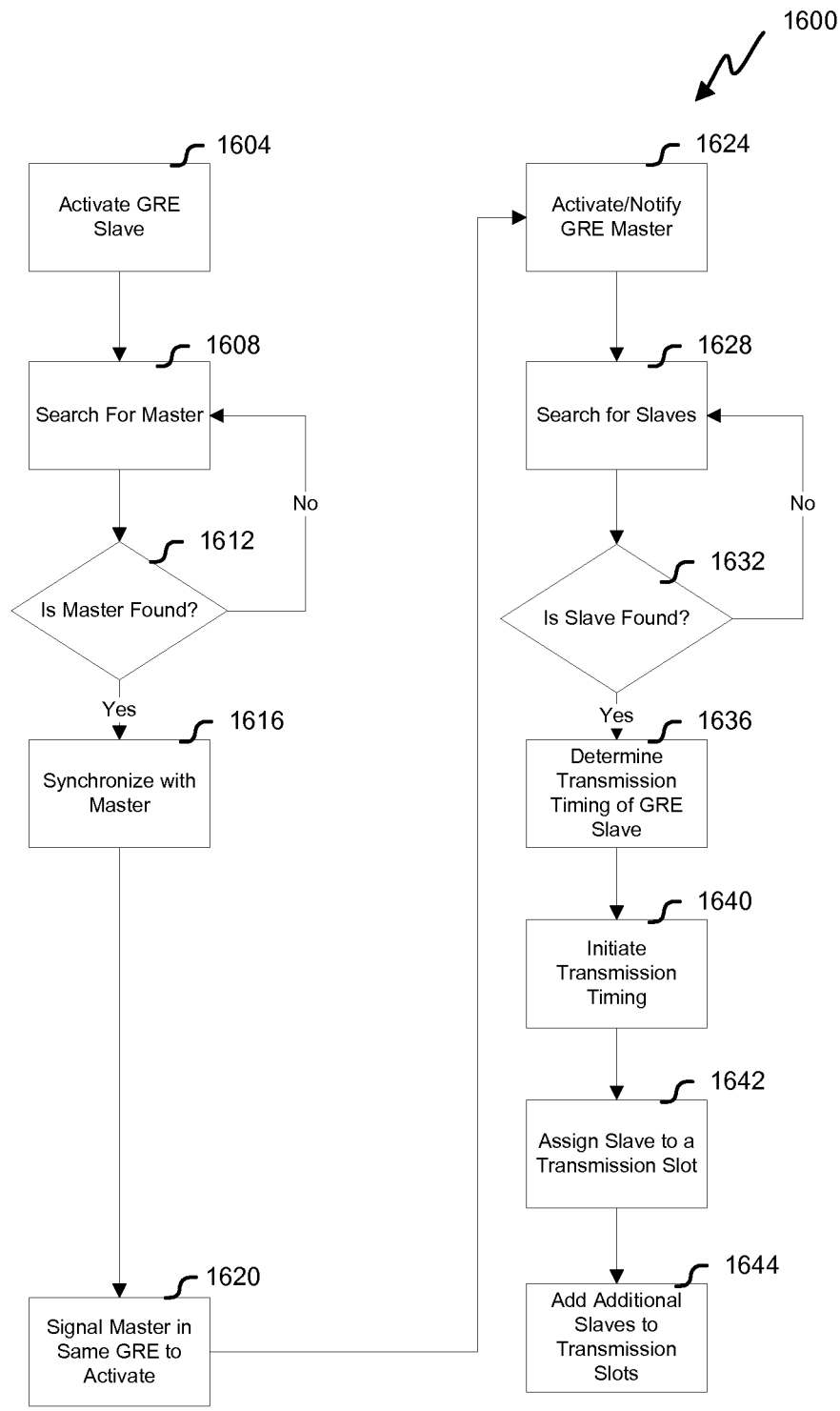
FIGS. 16A and 16B illustrate flowcharts of embodiments of processes synchronization of group range extenders.

FIG. 16A illustrates a flowchart of an embodiment of a process 1600 for synchronizing a GRE 1504. The process 1600 for synchronizing the GRE 1504 begins in step 1604 when the GRE 1504 is activated. When the GRE 1504 (i.e., turned on), a slave of the GRE 1504 is activated. After the slave of the GRE is active the slave of the GRE searches for a master to synchronize with, step 1608. If a master is not found to synchronize with, the slave of the GRE 1504 keeps searching for a master to synchronize with. If the slave of the GRE 1504 finds a master, the slave of the GRE 1504 synchronizes with the master 1616 and signals a master of the GRE 1504 to active 1620.

The master of the GRE 1504 is activated, step 1624. If the master of the GRE 1504 is already activated, then the master of the GRE 1504 is notified that the slave of the GRE 1504 has found a new master. There are various reasons the slave of the GRE 1504 might synchronize to a new master. For example, the GRE 1504 might be taken out of range of the master. If the slave of the GRE 1504 is synchronized with a master, then the master of the GRE 1504 is notified. In step 1628, the master of the GRE 1504 searches for slaves. A determination is made whether a slave is found, step 1632. If a slave is not found, the master of the GRE 1504 searches for a slave, step 1628. If a slave is found, the master of the GRE 1504 determines a timing of the slave of the GRE 1504, step 1636. The master of the GRE 1504 could determine the timing of the slave of the GRE 1504 in various ways. For example, the master of the GRE 1504 could receive a signal independent of a transceiver, such as through circuitry in the GRE 1504. In another example, the master of the GRE 1504 can learn the transmission timing of the slave of the GRE 1504 on a dedicated transmission slot for passing data.

After determining the transmission timing of the slave of the GRE 1504, the master of the GRE 1504 initiates a timing sequence, step 1640, and assigns the slave to a transmission slot, step 1642. The master of the GRE 1504 can also add additional slave to empty transmission slots, step 1644. In an alternate embodiment, steps 1636 is omitted such that the master of the GRE 1504 does not take into account of when the slave of the GRE 1504 is transmitting.

Figure 16B:
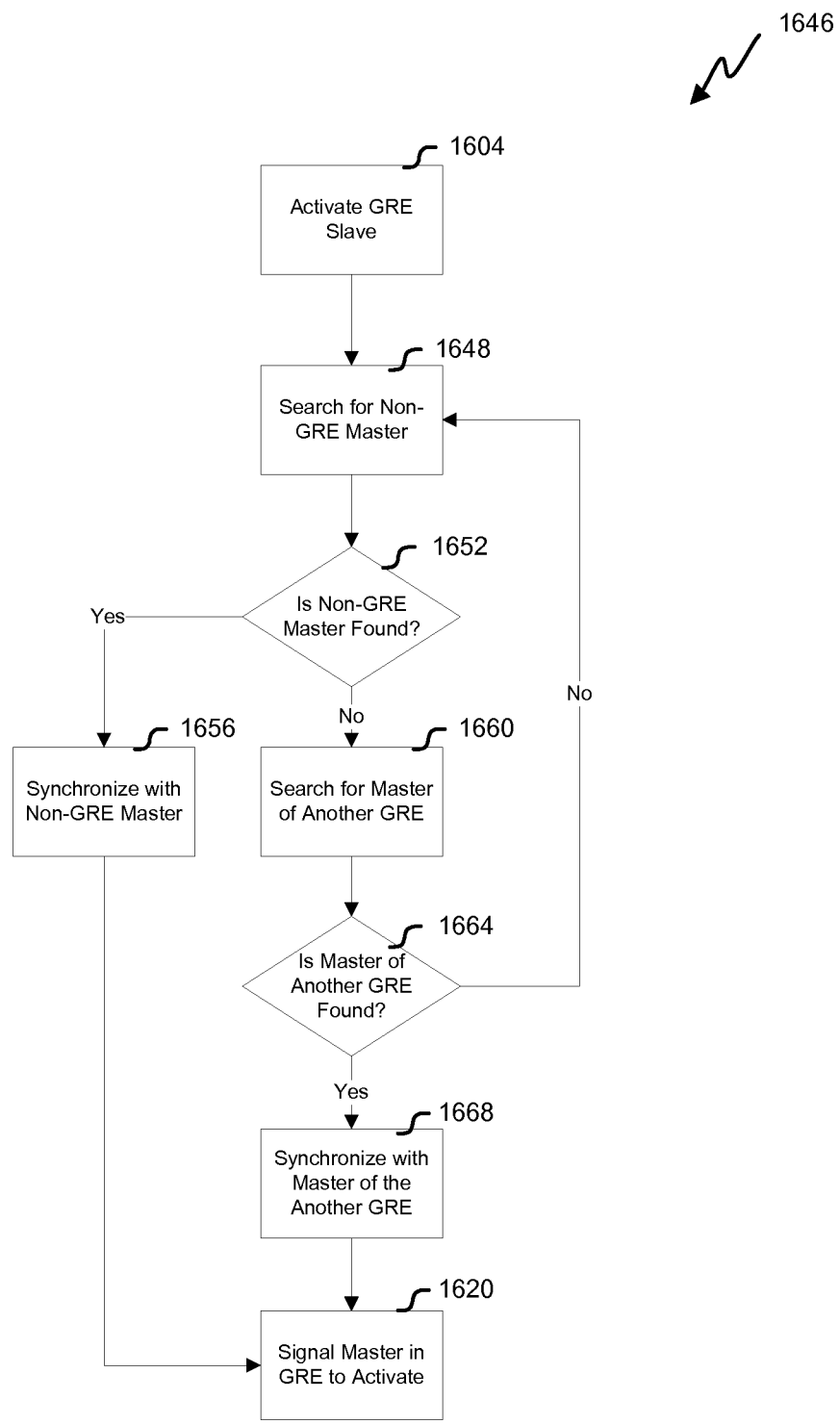

Referring next to FIG. 16B, a flowchart of another embodiment of a synchronization process 1646 for a slave of a first GRE 1504-1 is shown. In the synchronization process 1646 the slave of the first GRE 1504-1 can distinguish between a non-GRE master and a master of a second GRE 1504-2. The process beings in step 1604 where the slave of the first GRE 1504-1 activates and starts looking for a master. In step 1648, the slave of the first GRE 1504-1 searches for a non-GRE master. A determination is made whether a non-GRE master is found, 1652. If a non-GRE master is found, the slave of the first GRE 1504-1 synchronizes with the non-GRE master, step 1656, and the master of the first GRE 1504-1 is signaled to activate, step 1620.

If a non-GRE master is not found in step 1652, the process flows to step 1660 where the slave of the first GRE 1504-1 searches of a master of a second GRE 1504-2. A determination is made whether the master of the second GRE 1504-2 is found, step 1664. If the master of the second GRE 1504-2 is not found, the process returns to step 1648. If the master of the second GRE 1504-2 is found, then the slave of the first GRE 1504-1 synchronizes with the master of the second GRE 1504-2, step 1668. After the slave of the first GRE 1504-1 synchronizes with the master of the second GRE 1504-2, a signal is sent to the master of the first GRE 1504-2 to activate, step 1620.

Figure 17:
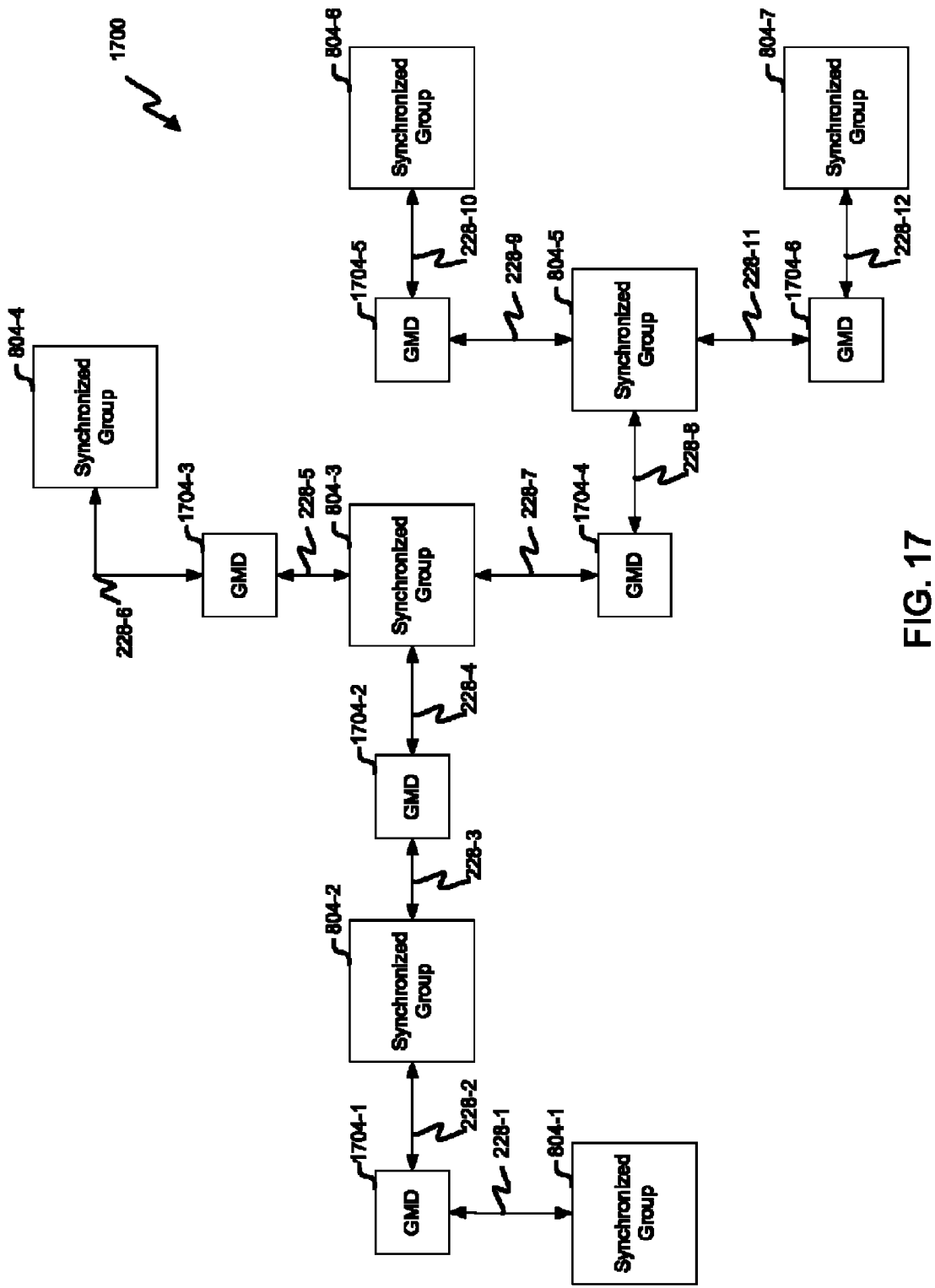
FIG. 17 depicts a block diagram of an example embodiment of a mesh network.

FIG. 17 depicts a block diagram of an example embodiment of a mesh network 1700. In the mesh network 1700, users on the mesh network 1700 can hear one another and communicate to one another. A plurality of Group Mesh Devices (GMDs) 1704 are shown linking a plurality of synchronization groups 804. A GMD 1704 has the functionality of a signal compounder 104 and a GRE 1504, but may also have the ability to transfer data between two multivoice radios 204. As describe previously where the signal compounder 104 may be imbedded into a multivoice radio 204, a GMD 1704 may be imbedded into a multivoice radio 204 or other kinds of applicable radios. The first synchronized group 804-1 may send all its voice and data information through a multivoice radio 204 to a first GMD 1704-1 via wired connection 228-1. The first GMD 1704-1 may combine the information with a microphone 112, if a microphone 112 is attached to the first GMD 1704-1, and send all the applicable voice and data through wired connection 228-2 to a second synchronized group 804-2. Similarly, all data from the second synchronized group 804-2 is transferred through the first GMD 1704-1 to the first synchronized group 804-1. The GMD 1704 may connect to a headset 120, which means a user may speak and hear through the headset 120 attached to the first GMD 1704-1 the appropriate voice information transmitted in the mesh network 1700. Data that may be transferred through a GMD 1704 may include group identification numbers and/or a mesh network identification number. More than one mesh network identification number may be transferred.

The combined applicable information from the first synchronized group 804-1 and the second synchronized group 804-2 is transferred through the second GMD 1704-2 via wired connections 228-3 and wired connection 228-4 to a third synchronized group 804-3.

Information from a fourth synchronized group 804-4 is transferred through the third GMD 1704-3 via wired connections 228-6 and wired connection 228-5 to the third synchronized group 804-3. In a reverse path, the appropriate information from the first synchronized group 804-1, the second synchronized group 804-2, and the third synchronized group 804-3 is transferred through the third GMD 1704-3 via wired connections 228-6 and wired connection 228-5 to the fourth synchronized group 804-4. Information from a sixth synchronized group 804-6 is transferred through a fifth GMD 1704-5 via wired connections 228-10 and wired connection 228-9 to a fifth synchronized group 804-5. Information from a seventh synchronized group 804-7 is transferred through the a GMD 1704-6 via wired connections 228-12 and wired connection 228-11 to the fifth synchronized group 804-5. The appropriate information from the fifth synchronized group 804-5, the sixth synchronized group 804-6, and the seventh synchronized group 804-7 is transferred through the fourth GMD 1704-4 via wired connections 228-7 and wired connections 228-8 to the third synchronized group 804-3. Thus information is shared between the synchronized groups 804. A person talking on a multivoice radio 204 in the first synchronized group 804-1 can communicate with any other person with a multivoice radio 204 on any of the synchronized groups.

In one embodiment, an individual will have two multivoice radios 204 with a GMD 1704 connecting the two multivoice radios 204. Each multivoice radio 204 on this individual will be part of a separate synchronized group 804. In another embodiment, one or more long-range radios 220, or other type of radio, may be connected to the mesh network 1700 as shown in previous embodiments and examples.

A mesh network, or a wireless conferencing system (e.g., a multivoice radio system), may have a problem with too many open microphones. Thus, in an embodiment some radios have push-to-talk (PTT) capability. In various embodiments, a switch-to-talk (STT) capability is added; either in addition to PTT capability or without PTT capability. Unlike PTT, which is a momentary contact that has to be held down to activate a microphone, a STT is a switch that when turned on activates a microphone and transmission capability until the STT is turn to the off position. This STT can be put in line with the microphone or digitally activated. PTT and/or STT capabilities allow a number of radios connected together in a group to be very large. PTT and/or STT capabilities also allow radios to not take up a transmission slot as shown in the '115 application. Radios with PTT and/or STT functionality can be listen-only devices until a switch or button is activated at which time the radio will try to take up a transmission slot.

In some full-duplex radios, one frequency is used to transmit on and a separate frequency is used to receive on. To keep a transmitter function from interfering with a receiver function, the transmitter and the receiver frequencies are separated enough to use filters to prevent interference. As the frequency separation between the transmitter and receiver gets closer, the filter may get more expensive, or the system may use more power to help isolate and filter the transmitter from the receive path. In one embodiment, to limit the transmitter function from interfering with the receiver function, two independent transceivers, where possible, transmit at the same time and receive at the same time. One method to accomplish follows:

1. When a first transceiver turns on and is a master, the first transceiver queries if other transceivers are within range.
2. If the first transceiver finds an appropriate second transceiver within range, the first transceiver may use the timing of when the first transceiver senses the second transceiver starting to transmit to set the first transceiver's timing so the first transceiver transmits at the same time as the second transceiver. The first transceiver may then hop to a different frequency and start a transmit protocol so that the first transceiver transmits at the same time as the second transceiver.
3. In cases where multiple appropriate transceivers are within range of the first transceiver that just turns on, the first transceiver may first looks for all appropriate transceivers within range and adjusts the timing of the first transceiver to a transceiver that is closest based on signal strength of signals the first transceiver receives from the multiple appropriate transceivers that are within range.
4. Transceivers may use another independent timing source, like GPS timing. Or, transceivers may periodically sense a timing of another transceiver the transceiver is synchronized to so that adjustment in timing may occur to the multiple appropriate transceivers.

When a second transceiver on a GRE 1504 turns on, the second transceiver may use the above protocol to synchronize to the first transceiver, but an appropriate transceiver the second transceiver may look for is a third transceiver, located on the same GRE 1504. Thus the second transceiver and third transceiver, both located on the GRE 1504, may transmit at the same time.

When a mesh network system is using the above protocol, or something similar to it, the protocol may need to account for two transceivers that do not control the timing of other transceivers that are right next to each other. A transceiver that controls a timing of another transceiver is a master. A transceiver that has its timing controlled by a master is called a slave. Several transceivers that have the same timing controlled by a specific master will be called a synchronized group 804. In a mesh network, several groups may be in the same area. FIG. 17 shows a mesh network 1700 with several groups in the same area though several groups may be out of range of other groups. As the mesh network 1700 is being formed, master transceivers may use the above protocol for synchronizing in timing with other master transceivers when appropriate. A possible example of the mesh network 1700 forming is as follows:

1. Assume that multivoice radios 204 connected to the first GMD 1704-1 are master transceivers that use the above method to synchronize. This means a first multivoice radio 204-1 that is a master and that is connected to the first GMD 1704-1 is part of the first synchronized group 804-1 and provides all the timing for the first synchronized group 804-1. A second multivoice radio 204-2 that is a master and that is connected to the first GMD 1704-1 is part of the second synchronized group 804-2.
2. Assume a third multivoice radio 204-3 that is connect to the second GMD 1704-2 and is part of the second synchronized group 804-2 is a slave. Since a fourth multivoice radio 204-4 that is connected to the second GMD 1704-2 is right next to the third multivoice radio 204, the fourth multivoice radio 204-4 may use the timing of the third multivoice radio 204-3 transmitting so that the fourth multivoice radio 204-4 and the third multivoice radio 204-3 transmit at the same time. Thus when the fourth multivoice radio 204 turns on, the fourth multivoice radio 204-4 may look for other multivoice radio 204 transceivers in the area but it may see the third multivoice radio 204-3 as a slave and being extremely close. The fourth multivoice radio 204-3 then can use the third multivoice radio 204 transmission timing instead of the second master multivoice radio 204-2 transmission timing for synchronizing transmitting timing of the fourth multivoice radio 204-4. The fourth multivoice radio 204-4 may then periodically go back and sense the start of the third multivoice radio 204-3 transmitting to adjust for timing error.
3. Assume a fifth multivoice radio 204-5 is a master and is connected to the fourth synchronized group 804-4 and is connected to the third GMD 1704-3; and assume the fourth synchronized group 804-4 was formed before becoming part of the mesh network 1700. Before joining the mesh network 1700 a sixth multivoice radio 204-6 that is connected to the third GMD 1704-3 may be looking for other master transceivers to join and create or add to a mesh network. When the sixth multivoice radio 204-6 senses a seventh multivoice radio 204-7 that is a master of the third synchronized group 804-3 and requests to join the third synchronized group 804-3, the sixth multivoice radio 204-6 may need to adjust its timing so it will transmit at the same time as the fifth multivoice radio 204-5. The sixth multivoice radio 204-6 may either ask a seventh multivoice radio 204-7, which is a master, for an appropriate transmission timing to match the fifth multivoice radio 204-5 transmission timing or the seventh multivoice radio 204-7 may communicate to the fifth multivoice radio 204-5 to synchronize to the timing of sixth multivoice radio 204-5, which in turn may cause an adjustment of timing for the fourth synchronized group 804-4, or a combination of adjustment of timing for both the third synchronized group 804-3 and the fourth synchronized group 804-4 may be used, which may cause an adjustment of timing for the whole mesh network 1700.
4. Assume a fifth multivoice radio 204-5, which is connected to the fourth synchronized group 804-4 and is connected to the third GMD 1704-3, is a slave and the fourth synchronized group 804-4 is not part of a mesh network 1700. Before joining the mesh network 1700 the sixth multivoice radio 204-6 that is connected to the third GMD 1704-3 may be looking for other master transceivers to join and create or add to a mesh network. When the sixth multivoice radio 204-6 senses the seventh multivoice radio 204-7, which is master of the third synchronized group 804-3, and requests to join the third synchronized group 804-3, the sixth multivoice radio 204-6 may need to adjust its timing so it will transmit at the same time as the fifth multivoice radio 204-5. The sixth multivoice radio 204-6 may either ask the seventh multivoice radio 204-7 for an appropriate transmission timing to match the fifth multivoice radio 204-5 transmission timing, or the seventh multivoice radio 204-7 may cause timing on the sixth multivoice radio 204-6 to change, which in turn may be sensed by the fifth multivoice radio 205-5, which may change the fifth multivoice radio 205-5 timing as well which may be communicated to the master multivoice radio of group 804-4 to change the timing of the fourth synchronized group 804-4 or a combination of adjustment of timing for both the third synchronized group 804-3 and the fourth synchronized group 804-4. Timing changes to the third synchronized group 804-3 may cause an adjustment of timing for the whole mesh network 1700. The fifth multivoice radio 204-5 may request that the master multivoice radio 204 of the fourth synchronized group 804-4 adjust its timing so that the fifth multivoice radio 204-5 transmits at the same time as the sixth multivoice radio 204-6. This may be done in several ways. One way would be for the fifth multivoice radio 204-5 to request a different slave transmission timing or time slot from the master multivoice radio 204 of the fourth synchronized group 804-4. The slave may just ask for the master to make timing adjustment until the fifth multivoice radio 204-5 and the sixth multivoice radio 204-6 are transmitting at the same time. The fifth multivoice radio 204-5 may also ask to become the master of the fourth synchronized group 804-4, after which the fifth multivoice radio 204-5 can more easily adjust the timing of the fourth synchronized group 804-4. When these kinds of changes occur in a system, timing changes may cause timing changes to ripple through the whole mesh network 1700 so appropriate transceivers are transmitting at the same time.

Figure 18:
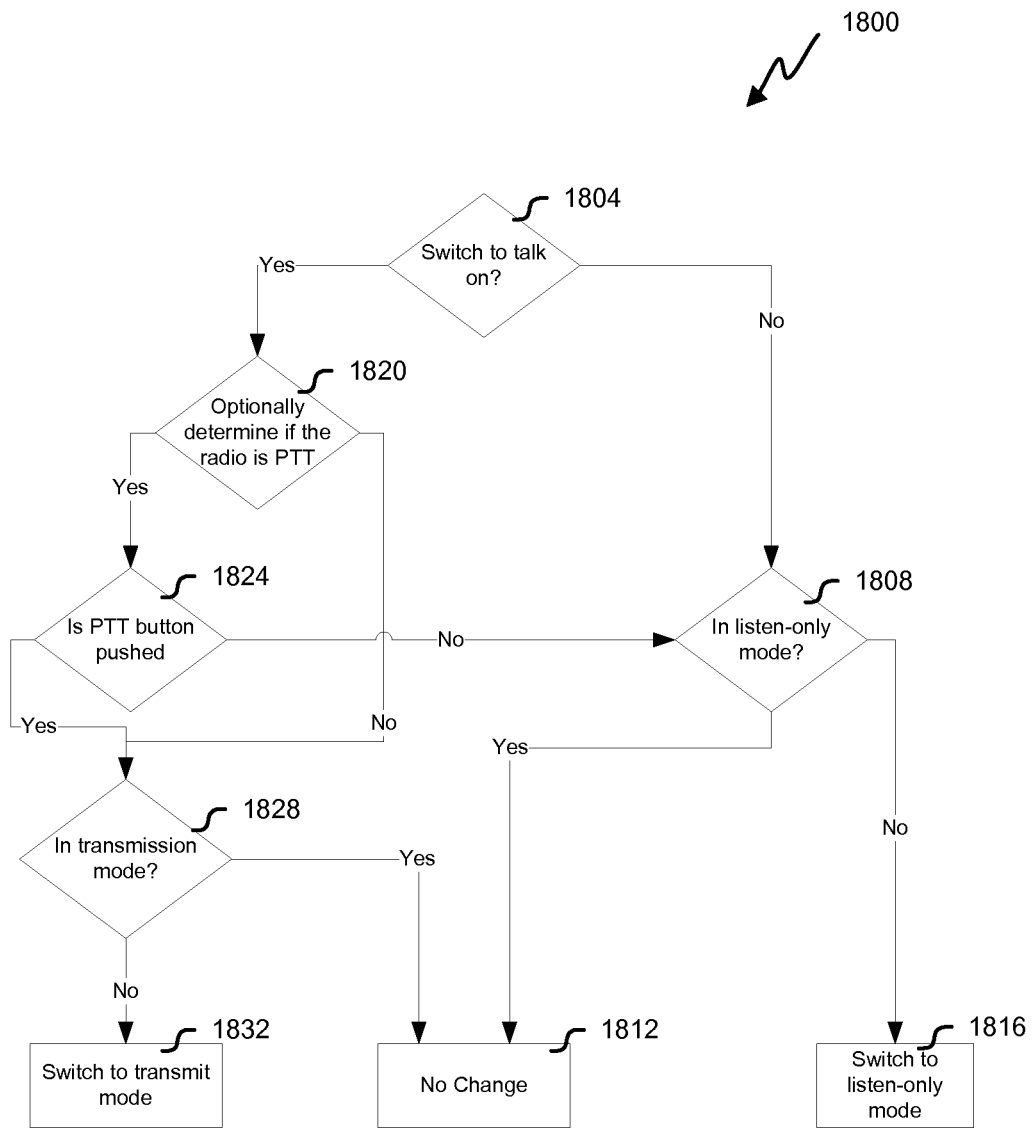
FIG. 18 illustrates a flowchart of an embodiment of a process for configuring a radio to switch between a transmit mode and a listen-only mode.

In FIG. 18, a flowchart of an embodiment of a process for configuring a radio between a transmit mode and a listen-only mode is illustrated. As explained in FIG. 15, a multivoice system uses time-division multiplexing and a given time period is divided into a plurality of transmission slots. When a multivoice radio 204 receives a transmission slot assignment, the multivoice radio 204 is said to be in a transmit mode. A problem arises when there are more multivoice radios 204 than available transmission slots. In some embodiments, a multivoice radio 204 is configured to only receive transmissions. When a multivoice radio 204 is configured to only receive transmissions, the multivoice radio 204 is in a listen-only mode. By having some multivoice radios 204 in the listen-only mode, more multivoice radios 204 can be added to a multivoice radio system than there are transmission slots available.

In some embodiments, a switch-to-talk (STT) button (or switch, toggle, rocker, etc.), is added to a multivoice radio 204 to toggle the multivoice radio 204 between the transmit mode and the listen-only mode. A STT method 1800 is a method for changing a multivoice radio 204 between the transmit mode and the listen-only mode. The method 1800 begins in step 1804 where the multivoice radio determines whether the STT button is activated. If the STT button is activated, then the process flows to step 1820. If the STT button is not active (such as turned off), the process flows to step 1808.

In step 1808, the multivoice radio 204 determines whether the multivoice radio is already in the listen-only mode. If the multivoice radio 204 is already in the listen-only mode, then there is no change 1812. If the multivoice radio 204 is not in the listen-only mode, then the multivoice radio 204 switches to the listen-only mode 1816. When a multivoice radio 204 is in the listen-only mode, the multivoice radio 204 no longer takes a transmission slot.

In step 1820 the multivoice radio 204 determines if the multivoice radio 204 has a push-to-talk (PTT) button. If the multivoice radio 204 has a PTT button, then the process flows to step 1824 and the multivoice radio 204 determines if the PTT button is pushed. If the PTT button is not pushed then the process flows to step 1808. If it is determined that the PTT button is pushed or if the multivoice radio 204 is not a PTT radio, the process flows to step 1828. In step 1828, the multivoice radio 204 determines whether the multivoice radio 204 is already in transmit mode. If the multivoice radio 204 is already in transmit mode, i.e., assigned a transmission slot, then there is no change 1812. If the multivoice radio 204 is not in the transmit mode, then the multivoice radio 204 switches to the transmit mode. The multivoice radio 204 can switch to the transmit mode by requesting a transmission slot from a master.

There are also several other embodiments of using STT. In one alternative embodiment, the STT switch is located remotely from the multivoice radio 204. A remote STT switch could be wired or wireless. For example the STT switch could be located on a headset. In another example, the STT switch is placed on an assault rifle and communicates wirelessly with the multivoice radio 204. Further, STT can also be used for radio discipline, for example so that not so many users are heard at the same time. In other embodiments, a multivoice radio 204 acting as a master can perform one or more steps of the STT method 1800. In other embodiments an external unit can be added to the multivoice radio 204, such as a signal compounder 104 or a specially made unit can perform one or more of the steps in the STT method 1800. In still further embodiments, there does not need to be a manually operated STT switch. For example, a multivoice radio 204 could switch to the transmit mode based on a volume threshold from the microphone being reached. And a multivoice radio could switch to the listen-only mode if a second volume threshold from the microphone is not reached in a given time period.

For example, if a user does not speak into a microphone of the multivoice radio 204 for sixty seconds, then the multivoice radio 204 could switch from the transmit mode to the listen-only mode. In another example, one or more transmission slots are reserved for emergencies. A multivoice radio 204 that is assigned an emergency transmission slot is automatically removed by the master from the emergency transmit slot after ten or fifteen seconds. A signal on a management transmission slot could be used, or even a signal of a different frequency could be used to relay the STT button selection. A management transmission slot is a transmission slot reserved for transferring data, other than voice. Additionally, there could also be a hierarchy of STT buttons. For example, if a user had a remote STT button and a STT on the multivoice radio 204 and the remote STT button was selecting the transmit mode but the STT button on the multivoice radio 204 selecting the listen-only mode, the remote STT button could control and the multivoice radio 204 would switch to the transmit mode. In another embodiment, a multivoice radio 204 can request that all low priority radios be set to listen-only mode either through a normal transmission time slot or through the management transmission slot. Or a multivoice radio 204 may request individual multivoice radios 204 go to listen-only mode either through the normal transmission time slot or through the management transmission slot.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

The subject matter of embodiments of the present invention is described here with specificity to meet statutory requirements, but this description is not necessarily intended to limit the scope of any claims. The object matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Though some figures show radios that look like hand-held radios and this disclosure often describes using radios, embodiments of the invention can apply to non-hand-held radios including stationary radios located in a building or vehicle, mobile phones, and/or to telephones. One side of the communication system will be a single user full-duplex type radio that is usually meant for one person like a cell phone. This single user radios can be connected together into a conferencing system like cell phones are currently combined into a conference call through the use of a base station. Further, though this application uses the phrase "radio communication," the term "radio" in not meant to limit communication to radio frequencies. Instead "radio," when referring to radio communication, refers to communication using a frequency or plurality of frequencies in the electro-magnetic spectrum.

A number of variations and modifications of the disclosed embodiments can also be used. For example, many embodiments refer to the first transceiver 108 as a short-range transceiver and the second transceiver 110 as a long-range transceiver. But other embodiments could have the first transceiver 108 as a long-range transceiver and the second transceiver 110 as a short-range transceiver. Further, the first transceiver 108 and the second transceiver 110 could have roughly, or exactly, the same range. Additionally, many embodiments showed the signal compounder 104 in communication with the PTT long-range radio 220. In other embodiments, other types of radios can be substituted for the PTT long-range radio 220. For example, a duplex radio, such as a cell phone could replace the long-range radio 220.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal compounders (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A two-way radio system for combining a short-range, handheld radio that is part of a wireless conferencing system using time-division multiplexing, without using a base station, with a long-range, handheld radio, the two-way radio system comprising:
    a first radio, the first radio comprising:
        a first transmitter that operates in a first frequency band to transmit wireless communication to a third radio and a fourth radio, wherein the third radio and the fourth radio are two-way, handheld radios, and
        a first receiver that operates in the first frequency band to receive time-division multiplexed wireless communication from the third radio and the fourth radio without using a base station; and
    a signal compounder comprising:
        a first connection to the first radio, wherein the signal compounder receives a first signal from the first radio through the first connection;
        a second connection to a second radio, wherein:
            the second radio has a second transmitter that operates in a second frequency band to transmit wireless communication to a fifth radio,
            the second radio has a second receiver that operates in the second frequency band to receive wireless communication from the fifth radio, and
            the signal compounder receives a second signal from the second radio though the second connection; and
        a third connection to a headset, wherein:
            the headset has a microphone and a speaker,
            the signal compounder receives a third signal from the headset,
            the signal compounder sends the third signal to the first radio through the first connection, and
            the signal compounder sends the third signal to the second radio through the second connection.

2. The two-way radio system for combining a short-range, handheld radio that is part of a wireless conferencing system using time-division multiplexing, without using a base station, with a long-range, handheld radio as recited in claim 1, wherein there is no overlap of frequencies between the first frequency band and the second frequency band.

3. The two-way radio system for combining a short-range, handheld radio that is part of a wireless conferencing system using time-division multiplexing, without using a base station, with a long-range, handheld radio as recited in claim 1, wherein the signal compounder is in a separate housing from the first radio and from the second radio.

4. The two-way radio system for combining a short-range, handheld radio that is part of a wireless conferencing system using time-division multiplexing, without using a base station, with a long-range, handheld radio as recited in claim 1, wherein:
the second radio is a half-duplex radio, and
the fifth radio is a half-duplex radio.

5. The two-way radio system for combining a short-range, handheld radio that is part of a wireless conferencing system using time-division multiplexing, without using a base station, with a long-range, handheld radio as recited in claim 1, wherein the first radio, the third, and the fourth radio are duplex radios, such that a user of either the first radio, the third, or the fourth radio can speak to other users and listen to radio communication simultaneously on the first frequency band.

6. The two-way radio system for combining a short-range, handheld radio that is part of a wireless conferencing system using time-division multiplexing, without using a base station, with a long-range, handheld radio as recited in claim 1, wherein the first transmitter and the first receiver are combined as a transceiver.

7. The two-way radio system for combining a short-range, handheld radio that is part of a wireless conferencing system using time-division multiplexing, without using a base station, with a long-range, handheld radio as recited in claim 1, wherein the signal compounder further comprises circuitry that:
combines the first signal and the second signal to create a first combined signal; and
sends, through the third connection, the first combined signal to the speaker.

8. A method for combining a short-range radio conferencing system with a long-range radio, the method comprising:
receiving a first signal from a first radio, wherein:
the first radio operates in a first frequency band to transmit and receive wireless communication to and from a third radio and a fifth radio;
the first radio, the third radio, and the fifth radio use time-division multiplexing for duplex communication; and
the first radio, the third radio, and the fifth radio are configured to communicate with each other without using a base station;
receiving a second signal from a second radio, wherein:
the second radio is not the first radio, and
the second radio operates in a second frequency band to transmit and receive wireless communication to and from a fourth radio;
receiving a third signal from a microphone, wherein the microphone is separate from the first radio and the second radio;
sending the third signal to the first radio for transmission on the first frequency band; and
sending the third signal to the second radio for transmission on the second frequency band.

9. The method for combining the short-range radio conferencing system with the long-range radio as recited in claim 8, wherein there is no overlap of frequencies in the first frequency band and the second frequency band.

10. The method for combining the short-range radio conferencing system with the long-range radio as recited in claim 8, further comprising sending the first signal to the second radio for transmission on the second frequency band.

11. The method for combining the short-range radio conferencing system with the long-range radio as recited in claim 10, further comprising sending the second signal to the first radio for transmission on the first frequency band.

12. The method for combining the short-range radio conferencing system with the long-range radio as recited in claim 8, further comprising:
combining the first signal and the second signal to create a first combined signal; and
sending the first combined signal to a speaker.

13. The method for combining the short-range radio conferencing system with the long-range radio as recited in claim 8, wherein:
the second radio is a half-duplex radio; and
an external wired connection is used to send and receive signals to and from the second radio.

14. A signal compounder for combining a wireless conferencing system with a long-range radio, the signal compounder comprising:
a first connection for receiving a first signal from a first radio, wherein:
the first radio has a first transceiver that operates in a first frequency band to transmit and receive wireless communication to and from a third radio and a fifth radio;
the first radio, the third radio, and the fifth radio use time-division multiplexing for duplex communication; and
the first radio, the third radio, and the fifth radio are configured to communicate with each other without using a base station;
a second connection for receiving a second signal from a second radio, wherein the second radio has a second transceiver that operates in a second frequency band to transmit and receive wireless communication to and from a fourth radio;
a third connection for receiving a third signal from a microphone; and
circuitry or a processor capable of:
transmitting, through the first connection for transmission on the first frequency band, the third signal to the first radio, and
transmitting, through the second connection for transmission on the second frequency band, the third signal to the second radio.

15. The signal compounder for combining the wireless conferencing system with a long-range radio as recited in claim 14, further comprising a user-operated switch that allows a user of the signal compounder to toggle between:
a first mode that transmits the first signal or the second signal to the first connection, the second connection, or the third connection, and
a second mode that prevents the signal compounder from transmitting the first signal or the second signal to the first connection, the second connection, or the third connection.

16. The signal compounder for combining the wireless conferencing system with a long-range radio as recited in claim 14, wherein the circuitry or the processor is further capable of transmitting, through the first connection, the second signal to the first radio such that a user of the third radio can hear communication from a user of the fourth radio.

17. The signal compounder for combining the wireless conferencing system with a long-range radio as recited in claim 14, wherein
the second radio is a half-duplex radio.

18. The signal compounder for combining the wireless conferencing system with a long-range radio as recited in claim 14, wherein the circuitry or the processor is further capable of:
 combining the third signal and the second signal to form a first combined signal, and
 transmitting the first combined signal to the first connection for transmission to the third radio so that a user of the third radio can hear, simultaneously, both a user of the fourth radio and a user of the headset.

19. The signal compounder for combining the wireless conferencing system with a long-range radio as recited in claim 14, wherein there is no overlap of frequencies between the first frequency band and the second frequency band.

20. The signal compounder for combining the wireless conferencing system with a long-range radio as recited in claim 14, wherein the first connection is an external, wired connection.

* * * * *